(12) United States Patent
Lee et al.

(10) Patent No.: US 12,159,111 B2
(45) Date of Patent: Dec. 3, 2024

(54) SYSTEM AND METHOD FOR PROVIDING VOICE ASSISTANT SERVICE REGARDING TEXT INCLUDING ANAPHORA

(71) Applicant: Samsung Electronics Co., Ltd., Suwon-si (KR)

(72) Inventors: Yeonho Lee, Suwon-si (KR); Munjo Kim, Suwon-si (KR); Sangwook Park, Suwon-si (KR); Youngbin Shin, Suwon-si (KR); Kookjin Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 17/536,907

(22) Filed: Nov. 29, 2021

(65) Prior Publication Data
US 2022/0138427 A1    May 5, 2022

Related U.S. Application Data

(63) Continuation of application No. PCT/KR2021/014951, filed on Oct. 22, 2021.

(30) Foreign Application Priority Data

Oct. 30, 2020   (KR) .......................... 10-2020-0143003

(51) Int. Cl.
  *G06F 40/30*   (2020.01)
  *G06F 40/103*   (2020.01)
  (Continued)

(52) U.S. Cl.
  CPC ............ *G06F 40/30* (2020.01); *G06F 40/103* (2020.01); *G06F 40/166* (2020.01);
  (Continued)

(58) Field of Classification Search
  CPC ...... G06F 40/30; G06F 40/103; G06F 40/279; G06F 40/166
  (Continued)

(56) References Cited

U.S. PATENT DOCUMENTS 7,398,196 B1   7/2008  Liu et al.
9,171,542 B2   10/2015 Gandrabur et al.
(Continued)

FOREIGN PATENT DOCUMENTS

JP   2018-170743   11/2018
KR   10-2009-0028908   3/2009
(Continued)

OTHER PUBLICATIONS

A. León-Montaño and L. Barba-Guaman, "Design of the architecture for text recognition and reading in an online assessment applied to visually impaired students," 2020 International Conference of Digital Transformation and Innovation Technology (Incodtrin), Quito, Ecuador, 2020, pp. 59-65, doi: 10.110 (Year: 2020).*

(Continued)

*Primary Examiner* — Bharatkumar S Shah
(74) *Attorney, Agent, or Firm* — Nixon & Vanderhye, P.C.

(57) ABSTRACT

A system and method for providing a voice assistant service for text including an anaphor are provided. A method, performed by an electronic device, of providing a voice assistant service includes: obtaining first text generated from a first input, detecting a target word within the first text and generating common information related to the detected target word, using a first natural language understanding (NLU) model, obtaining second text generated from a second input, inputting the common information and the second text to a second NLU model, detecting an anaphor included in the second text and outputting an intent and a parameter, (Continued)

based on common information corresponding to the detected anaphor, using the second NLU model, and generating response information related to the intent and the parameter.

15 Claims, 14 Drawing Sheets

(51) Int. Cl.
    *G06F 40/166*    (2020.01)
    *G06F 40/279*    (2020.01)
    *G06N 20/00*    (2019.01)
    *G10L 15/18*    (2013.01)
    *G10L 15/22*    (2006.01)
    *G10L 15/30*    (2013.01)
    *G10L 15/08*    (2006.01)

(52) U.S. Cl.
    CPC .......... *G06F 40/279* (2020.01); *G06N 20/00* (2019.01); *G10L 15/1815* (2013.01); *G10L 15/22* (2013.01); *G10L 15/30* (2013.01); *G10L 2015/088* (2013.01)

(58) Field of Classification Search
    USPC ....................................................... 704/232
    See application file for complete search history.

(56) References Cited

U.S. PATENT DOCUMENTS

| | | |
|---|---|---|
| 10,366,161 B2 | 7/2019 | Allen et al. |
| 11,081,107 B2 | 8/2021 | Gillespie et al. |
| 11,403,345 B2 | 8/2022 | Kim et al. |
| 2014/0257792 A1 | 9/2014 | Gandrabur et al. |
| 2018/0288109 A1 | 10/2018 | Kawachi et al. |
| 2019/0206405 A1 | 7/2019 | Gillespie et al. |
| 2020/0043478 A1 | 2/2020 | Lee |
| 2020/0143814 A1 | 5/2020 | Moniz |
| 2020/0279555 A1* | 9/2020 | Shapiro .................. G10L 15/22 |
| 2021/0042662 A1* | 2/2021 | Pu .......................... G06Q 50/01 |

FOREIGN PATENT DOCUMENTS

| | | |
|---|---|---|
| KR | 10-0920267 | 10/2009 |
| KR | 10-2020-0080951 | 7/2020 |
| KR | 2198295 | 1/2021 |

OTHER PUBLICATIONS

A. Leén-Montafio and L. Barba-Guaman, "Design of the architecture for text recognition and reading in an online assessment applied to visually impaired students," 2020 International Conference of Digital Transformation and Innovation Technology (Incodtrin), Quito, Ecuador, 2020, pp. 59-65, doi: 10.1 (Year: 2020).*

S. V. Prajwal, G. Mamatha, p. Ravi, D. Manoj and S. K. Joisa, "Universal Semantic Web Assistant based on Sequence to Sequence Model and Natural Language Understanding," 2019 9th International Conference on Advances in Computing and Communication (ICACC), Kochi, India, 2019, pp. 110-115, doi: 10.1109/ (Year: 2019).*

S. Singh and S. Singh, "Review of Real-word Error Detection and Correction Methods in Text Documents," 2018 Second International Conference on Electronics, Communication and Aerospace Technology (ICECA), Coimbatore, India, 2018, pp. 1076-1081, doi: 10.1109/ICECA.2018.8474700. keywords: {Dictionaries; (Year: 2018).*

Search Report and Written Opinion issued Feb. 3, 2022 in counterpart International Patent Application No. PCT/KR2021/014951.

Extended European Search Report dated Nov. 8, 2023 issued in European Patent Application No. 21886715.8.

\* cited by examiner

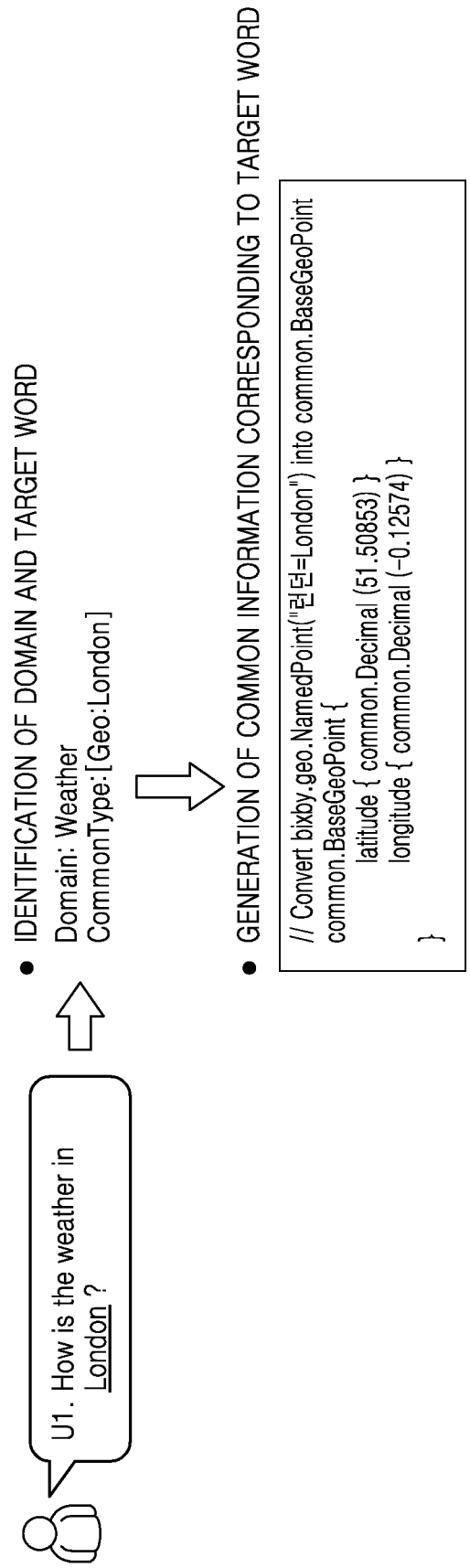

FIG. 4

| TEXT | DOMAIN |
|---|---|
| How is the weather in Busan [location] ? | Weather |
| What's the temperature in LA [location] now ? | Weather |
| Please, tell me the time in Shanghai [location]. | Clock |
| What time is it now in Brazil [location] ? | Clock |
| Please, find a famous restaurant in London [location]. | Restaurant |
| Please, tell me a restaurant that opens tomorrow [date]. | Restaurant |
| Please, tell me the weather on Sunday [date]. | Weather |

FIG. 5

| TARGET WORD | COMMON INFORMATION |
|---|---|
| 20.04.19 | common.BaseDate{<br>    year { common.Integer(2020) }<br>    month { common.Integer(4) }<br>    day {common.Integer(19) }<br>} |
| 2020/04/19 | common.BaseDate{<br>    year { common.Integer(2020) }<br>    month { common.Integer(4) }<br>    day {common.Integer(19) }<br>} |
| L.A | common.BaseGeoPoint{<br>    latitude { common.decimal(34.052235) }<br>    longitude { common.decimal(-118.243683) }<br>} |
| Los Angeles | common.BaseGeoPoint{<br>    latitude { common.decimal(34.052235) }<br>    longitude { common.decimal(-118.243683) }<br>} |

SYSTEM AND METHOD FOR PROVIDING VOICE ASSISTANT SERVICE REGARDING TEXT INCLUDING ANAPHORA

CROSS-REFERENCE TO RELATED APPLICATIONS

This application is a continuation of International Application No. PCT/KR2021/014951 designating the United States, filed on Oct. 22, 2021, in the Korean Intellectual Property Receiving Office and claiming priority to Korean Patent Application No. 10-2020-0143003, filed on Oct. 30, 2020, in the Korean Intellectual Property Office, the disclosures of which are incorporated by reference herein in their entireties.

BACKGROUND

Field

The disclosure relates to a system and method for providing a voice assistant service regarding text including an anaphor, and for example, to a system and method for providing a voice assistant service for text including an anaphor, based on common information about the target word.

Description of Related Art

As multimedia technology and network technology develop, users can receive various services using devices. In particular, as voice recognition technology develops, a user may input a voice (e.g., utterance) to a device and receive a response according to the voice input.

However, in the conventional art, when an anaphor is included in a user's input, it is difficult to accurately grasp a user's intention from the user's input including the anaphor, and it is also difficult to provide voice assistant services specialized for several domains while considering the meaning of the anaphor. Accordingly, there is a need for a technology capable of accurately identifying a user's intention from a user's input including an anaphor and effectively providing a response based on the user's intention to the user.

SUMMARY

Embodiments of the disclosure provide a system and method for providing a voice assistant service regarding text including an anaphor, by which common information representing a target word included in text of a user may be used to interpret an anaphor within other text.

Embodiments of the disclosure provide a system and method for providing a voice assistant service regarding text including an anaphor, by which a target word within text may be identified using a natural language understanding (NLU) model used to identify a domain of the text, and a voice assistant service specialized for a domain may be provided using common information representing the identified target word.

Embodiments of the disclosure provide a system and method for providing a voice assistant service regarding text including an anaphor, by which a target word within text may be identified using an NLU model used to identify a domain of the text, and common information representing the identified target word may be used by a plurality of other NLU models.

Embodiments of the disclosure provide a system and method for providing a voice assistant service regarding text including an anaphor, by which common information representing a target word may be corrected using an NLU model used to interpret the text.

According to an example embodiment of the disclosure, a method, performed by an electronic device, of providing a voice assistant service includes: obtaining first text generated from a first input, detecting a target word within the first text and generating common information related to the detected target word using a first natural language understanding (NLU) model, obtaining second text generated from a second input, inputting the common information and the second text to a second NLU model, detecting an anaphor included in the second text and outputting an intent and a parameter based on common information corresponding to the detected anaphor using the second NLU model, and generating response information related to the intent and the parameter.

According to an example embodiment of the disclosure, a server configured to provide a voice assistant service includes: a communication interface including circuitry configured to communicate with an electronic device, a storage storing one or more instructions, and a processor configured to execute the one or more instructions to configure the server to: obtain first text generated from a first input to the electronic device; detect a target word within the first text and generate common information related to the detected target word using a first natural language understanding (NLU) model; obtain second text generated from a second input; input the common information and the second text to a second NLU model; detect an anaphor included in the second text and obtain an intent and a parameter based on common information corresponding to the detected anaphor using the second NLU model; and generate response information related to the intent and the parameter.

According to an example embodiment of the disclosure, a non-transitory computer-readable recording medium has recorded thereon a computer program which, when executed, causes a device to perform operations corresponding to the method on a computer.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 illustrates generation of common information from first text by a common information management module, according to an embodiment of the disclosure.

FIG. 4 is a table showing domains corresponding to texts including target words, according to an embodiment of the disclosure.

FIG. 5 is a table showing common information corresponding to a target word, according to an embodiment of the disclosure.

DETAILED DESCRIPTION

Figure 1:
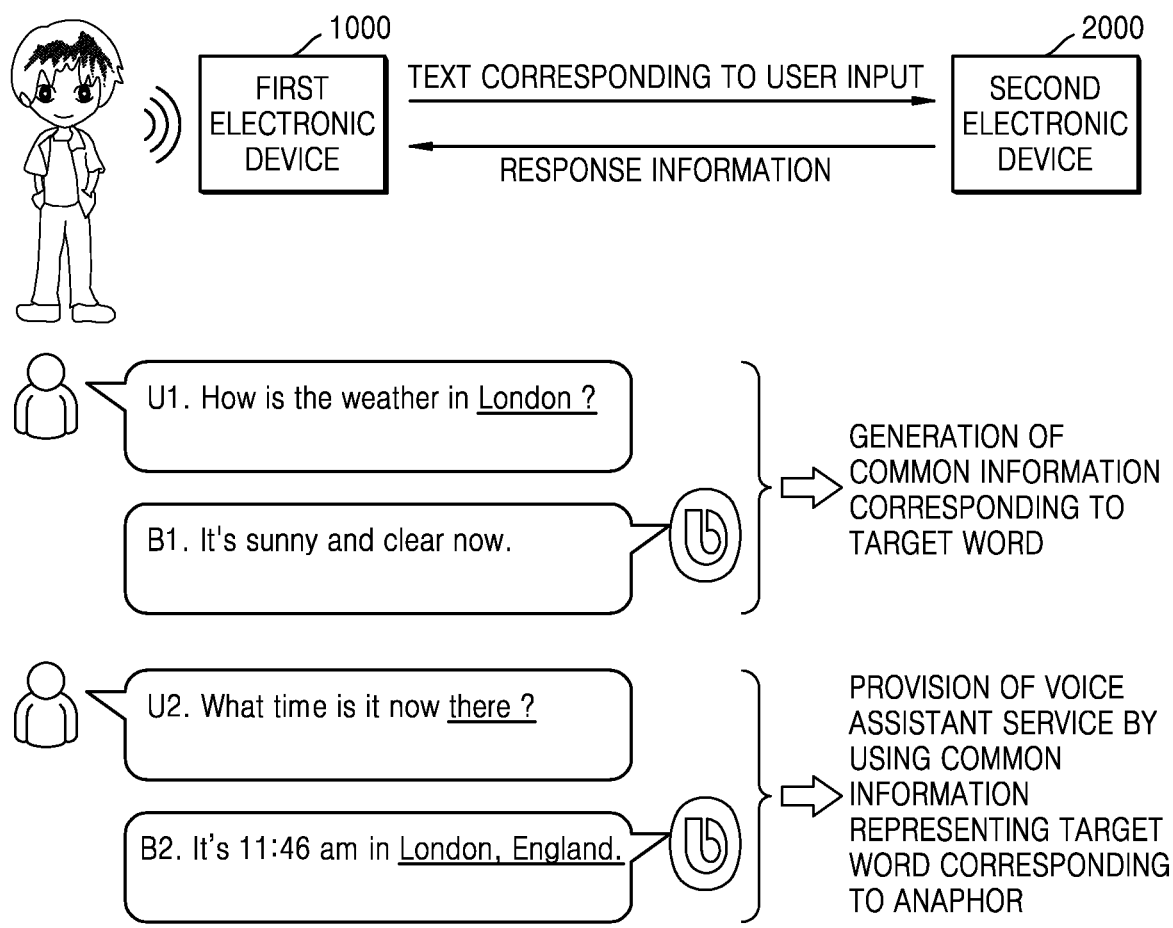
FIG. 1 is a diagram illustrating an example system for providing a voice assistant service, according to various embodiments.

Throughout the disclosure, the expression "at least one of a, b or c" indicates only a, only b, only c, both a and b, both a and c, both b and c, all of a, b, and c, or variations thereof.

Embodiments of the disclosure will now be described in greater detail with reference to the accompanying drawings. The disclosure may, however, be embodied in many different forms and should not be understood as being limited to the embodiments set forth herein. In the drawings, parts irrelevant to the description may be omitted for the simplicity of explanation, and like numbers refer to like elements throughout.

Throughout the disclosure, when an element is referred to as being "connected" or "coupled" to another element, it can be directly connected or coupled to the other element, or can be electrically connected or coupled to the other element with intervening elements interposed therebetween. The terms "comprises" and/or "comprising" or "includes" and/or "including" when used in this disclosure, specify the presence of stated elements, but do not preclude the presence or addition of one or more other elements.

A voice assistant service used herein may include a service that provides a conversation with a user. In the voice assistant service, a device may provide a device with a response message, like a person directly talking with a user, by taking into account the user's circumstances, the device's circumstances, and the like. In the voice assistant service, like a personal secretary of a user, information required by the user may be suitably generated and provided to the user. The voice assistant service may be linked to various services such as, for example, and without limitation, a broadcasting service, a content sharing service, a content providing service, a power management service, a game providing service, a chatting service, a document preparation service, a search service, a call service, a photo-taking service, a transportation recommendation service, a video playback service, or the like, in order to provide a user with necessary information or necessary functions.

A domain may refer, for example, to a field to which a user input input to a device is related, and may be previously set according to, for example, the meaning of the user input, an attribute of the user input, and the like. The domain may be classified according to, for example, a service associated with the user input or an application that performs an operation related to the user input. A natural language understanding (NLU) model and a natural language generation (NLG) model (e.g., each including various processing circuitry and/or executable program instructions) may be trained for each domain. Examples of the user input may include, but are not limited to, a voice input, a text input, and an image input, and may include any type of input that may be input from a user for a voice assistant service.

A target word may refer, for example, to a word that may be a target to be indicated by an anaphor. Examples of the target word may include, but are not limited to, a word indicating a location, a word indicating a date, a word indicating a time, and a word indicating a person.

Common information corresponding to the target word may include data commonly identifiable by a plurality of voice assistant modules as detailed data for identifying the target word. The common information may have, for example, a format that may be commonly identified by the plurality of voice assistant modules. For example, when the target word is "Seoul" and a type of common information is "location", common information corresponding to "Seoul" may be data representing a global positioning system (GPS) coordinate value indicating the location of Seoul. When, for example, the target word is "Tom" and the type of common information is "person", common information corresponding to "Tom" may be data representing identifiers (for example, a user ID, a telephone number, and a name) of Tom. For example, when the target word is "Christmas" and the type of common information is "Time/Date", common information corresponding to "Christmas" may be data representing December 25th.

The common information may be classified into a plurality of types according to preset anaphors. For example, types of common information corresponding to a target word may include, but are not limited to, "Location", "Date/Time" and "Person". The types of common information corresponding to the target word may be classified according to a preset criterion, and anaphors corresponding to the type of common information may be previously set. For example, when the type of common information is "Location", anaphors corresponding to "Location" may include "there", "near", "that place", and the like. For example, when the type of common information is "Date/Time", anaphors corresponding to "Date/Time" may include "that time", "the date", and the like. For example, when the type of common information is "Person", anaphors corresponding to "Person" may include he, him, his, she, her, and the like.

The disclosure will now be described in greater detail with reference to the accompanying drawings.

FIG. 1 is a view illustrating a system for providing a voice assistant service, according to an embodiment of the disclosure.

Referring to FIG. 1, a system for providing a voice assistant service may include a first electronic device 1000 and a second electronic device 2000.

The first electronic device 1000 may provide text corresponding to an input of a user to the second electronic device 2000, receive response information from the second electronic device 2000, and provide the response information to the user. The first electronic device 1000 may execute an application for providing a voice assistant service, receive the input of the user through functions provided by the executed application, and provide the user with a response message and a response operation.

The second electronic device 2000 may receive first text corresponding to the user input from the first electronic device 1000, detect a target word included in the first text, and generate and store common information representing the detected target word. The common information representing the target word may be used by a plurality of voice assistant modules within the second electronic device 2000, and the plurality of voice assistant modules within the second electronic device 2000 may be modules specialized for a plurality of domains for a voice assistant service.

The second electronic device 2000 may detect an anaphor included in second text corresponding to a user input after the first text from the second text, and may provide a voice assistant service through a voice assistant module specialized for the domain of the second text using common information indicating a target word corresponding to the anaphor.

The first electronic device 1000 and the second electronic device 2000 may include, but are not limited to, smartphones, tablet personal computers (PCs), PCs, smart TVs, mobile phones, personal digital assistants (PDAs), laptops, media players, micro servers, GPS devices, e-book terminals, terminals for digital broadcasting, navigation devices, kiosks, MP3 players, digital cameras, home appliances, other mobile or non-mobile computing devices, or the like. The first electronic device 1000 and the second electronic device 2000 may include wearable devices such as, for example, and without limitation, watches, glasses, hair bands, rings having a communication function and a data processing function, or the like. At least one of the first electronic device 1000 or the second electronic device 2000 may be a server device. However, embodiments of the disclosure are not limited thereto, and the first electronic device 1000 and the second electronic device 2000 may include any type of devices capable of providing a voice assistant service by interoperating with each other.

A network for communicatively connecting the first electronic device 1000 to the second electronic device 2000 may be implemented, for example, as a wired network such as, for example, and without limitation, a local area network (LAN), a wide area network (WAN), or a value added network (VAN), or as any type of wireless network such as a mobile radio communication network or a satellite communication network. The network may include a combination of at least two of a local area network (LAN), a wide area network (WAN), a value added network (VAN), a mobile radio communication network, or a satellite communication network, and is a data communication network in a comprehensive sense that allows the networks shown in FIG. 1 to communicate smoothly with each other, and may include a wired Internet, a wireless Internet, and a mobile wireless communication network. Examples of wireless communication may include, but are not limited to, Wi-Fi, Bluetooth, Bluetooth low energy (BLE), ZigBee, Wi-Fi Direct (WFD), ultra wideband (UWB), infrared Data Association (IrDA), and Near Field Communication (NFC).

Figure 2:
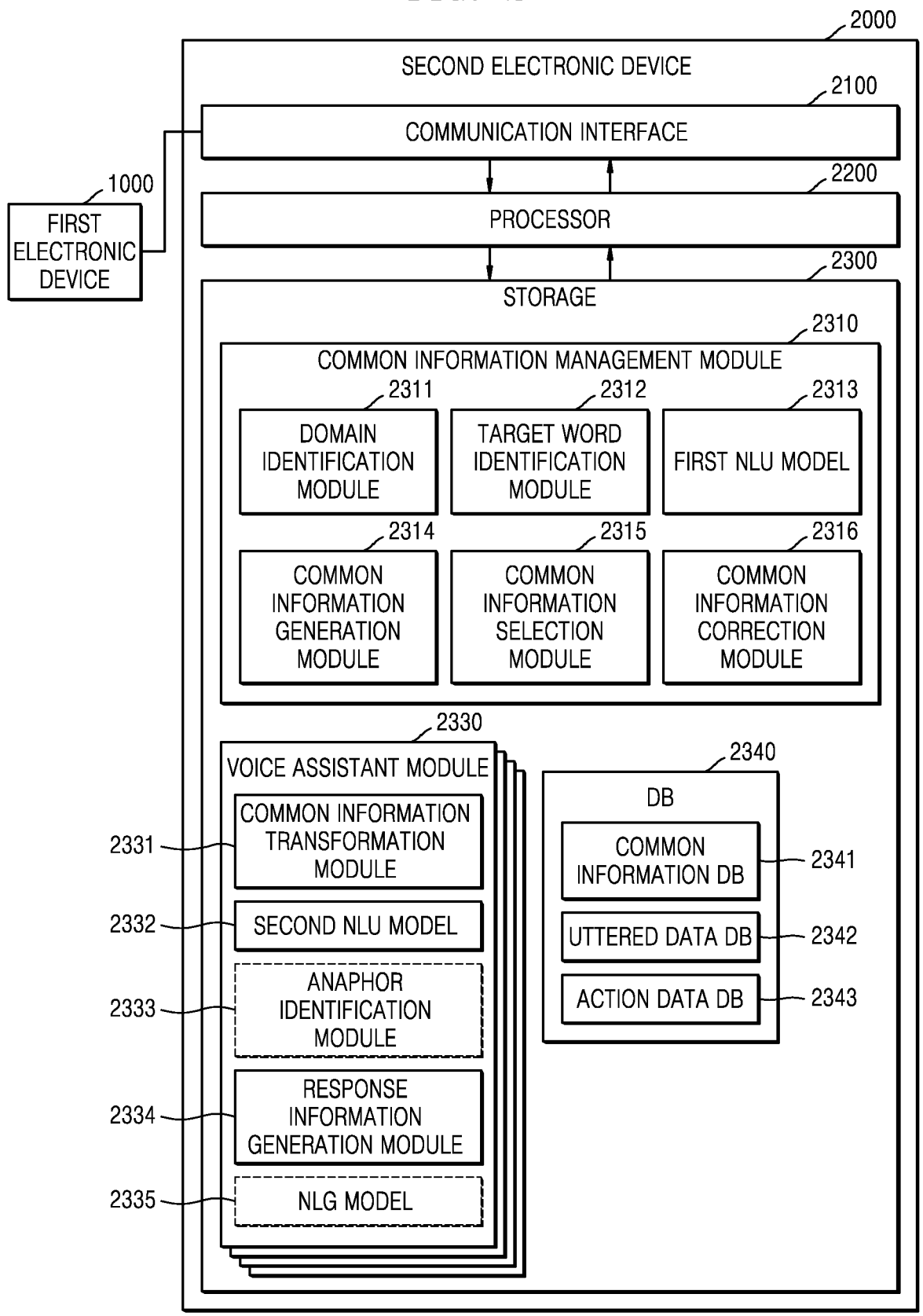
FIG. 2 is a block diagram illustrating an example configuration of a second electronic device according to various embodiments.

FIG. 2 is a block diagram of the second electronic device 2000 according to an embodiment of the disclosure.

Referring to FIG. 2, the second electronic device 2000 may include a communication interface (e.g., including communication circuitry) 2100, a processor (e.g., including processing circuitry) 2200, and a storage (e.g., memory) 2300. The storage 2300 may include various modules including various executable program instructions including, for example, a common information management module 2310, at least one voice assistant module 2330, and a DB (e.g., database) 2340.

The communication interface 2100 may include one or more components including various communication circuitry for communication with the first electronic device 1000. The communication interface 2100 may transmit or receive, to or from the first electronic device 1000, information necessary for providing a voice assistant service to the first electronic device 1000. The communication interface 2100 may communicate with another device (not shown) and another server (not shown) in order to provide a voice assistant service. For example, the communication interface 2100 may include a short-range wireless communication interface, a mobile communication interface, and a broadcasting receiver. The short-range wireless communication interface may include, but is not limited to, a Bluetooth communication interface, a BLE communication interface, a NFC interface, a WLAN (Wi-Fi) communication interface, a Zigbee communication interface, an IrDA communication interface, a WFD communication interface, a UWB communication interface, and an Ant+ communication interface. The mobile communication interface transmits or receives a wireless signal to or from at least one of a base station, an external terminal, or a server on a mobile communication network. The wireless signal may include various types of data according to transmission or reception of a voice call signal, a video call signal, or a text/multimedia message. The broadcast receiver receives a broadcast signal and/or broadcast-related information from an external source through a broadcast channel. The broadcast channel may include a satellite channel and a terrestrial channel.

The processor 2200 may include various processing circuitry and controls overall operations of the second electronic device 2000. For example, the processor 2200 may control a function of the second electronic device 2000 for providing a voice assistant service in the present specification, by executing the programs stored in the storage 2300, which will be described later.

The storage 2300 may store a program for processing and controlling the processor 2200. The storage 2300 may include at least one type of storage medium from among a flash memory type storage medium, a hard disk type storage medium, a multimedia card micro type storage medium, a card type memory (for example, SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The programs stored in the storage 2300 may be classified into a plurality of modules according to their functions, for example, into the common information management module 2310 and the voice assistant module 2330.

The common information management module 2310 may analyze text generated from the user input to identify a domain related to the text and a target word within the text, and may generate and manage common information related to the identified target word. The common information management module 2310 may accumulate and store the generated common information in a common information DB 2341, which will be described later, and may enable the voice assistant module 2330 to use the common information in order to interpret the second text. The target word may refer, for example, to a word that may be a target to be indicated by an anaphor, and examples of the target word may include, but are not limited to, a word indicating a location, a word indicating a date, a word indicating a time, and a word indicating a person. The common information management module 2310 may include various modules including various executable program instructions, including, for example, a domain identification module 2311, a target word identification module 2312, a first NLU model 2313, a common information generation module 2314, a common information selection module 2315, and a common information correction module 2316. When the second electronic device 2000 receives voice data of the user from the first electronic device 1000, the second electronic device 2000 may further include an automatic speech recognition (ASR) model (not shown) for recognizing a user's voice.

The domain identification module 2311 may identify a domain related to the text. The domain identification module 2311 may identify the domain of the text by analyzing the text generated from the user input using the first NLU model 2313, which will be described later. The domain identification module 2311 may identify the domain of the text, based on an output value output by the first NLU model 2313.

For example, first text of "How is the weather in London?" may be input to the first NLU model 2313, an output value indicating that the domain of the first text is "Weather" may be output by the first NLU model 2313, and the domain identification module 2311 may identify that the domain of the first text is "Weather", based on the output value output by the first NLU model 2313. For example, second text of "What time is it now there?" may be input to the first NLU model 2313, an output value indicating that the domain of the second text is "Time" may be output by the first NLU model 2313, and the domain identification module 2311 may identify that the domain of the second text is "Time", based on the output value output by the first NLU model 2313.

The target word identification module 2312 may identify a target word within the text and information related to the target word. The target word identification module 2312 may identify the target word and the type of common information corresponding to the target word by analyzing the text generated from the user input using the first NLU model 2313, which will be described in greater detail below. The target word identification module 2312 may identify the target word and the type of the common information corresponding to the target word, based on the output value output by the first NLU model 2313. For example, when the first text of "How is the weather in London?" is input to the first NLU model 2313, an output value indicating that a target word within the first text is "London" and the type of common information of "London" is "location" may be output by the first NLU model 2313, and the target word identification module 2312 may identify that the target word within the first text is "London" and the type of common information corresponding to "London" is "location", based on the output value output by the first NLU model 2313.

Although it has been described above that the domain identification module 2311 and the target word identification module 2312 are separate modules, embodiments of the disclosure are not limited thereto. For example, a domain related to text, a target word, and the type of common information corresponding to the target word may be identified by a single module.

The first NLU model 2313 may analyze the text generated from the user input, and may output the domain of the text and the target word within the text, based on a result of the analysis. The first NLU model 2313 may also output the type of common information corresponding to the target word included in the text generated from the user input, from the text. The output value output by the first NLU model 2313 may be used by the domain identification module 2311 and the target word identification module 2312. The first NLU model 2313 may be an artificial intelligence (AI) model trained to identify the domain and target word corresponding to the text by interpreting the text. For example, the first NLU model 2313 may be a model trained using the text tagged with the type of common information and the domain of the text as learning data. For example, an input value of the first NLU model 2313 may be the text generated from the user input, and output values of the first NLU model 2313 may be a target word tagged with the type of common information and the domain of the text. However, embodiments of the disclosure are not limited thereto.

The common information generation module 2314 may generate the common information corresponding to the target word. The common information generation module 2314 may generate, as the common information, detailed data representing the target word, and the common information may be generated according to a format commonly identifiable by the plurality of voice assistant modules 2330. For example, when the target word is "Seoul" and the type of common information is "location", the common information generation module 2314 may generate a GPS coordinate value indicating the location of "Seoul" as the common information corresponding to "Seoul", in a format commonly identifiable by a plurality of NLU models. For example, when the target word is "Tom" and the type of common information is "person", the common information generation module 2314 may generate an identifier of "Tom" as the common information corresponding to "Tom", in the format commonly identifiable by the plurality of NLU models. For example, when the target word is "Christmas" and the type of common information is "Time/Date", the common information generation module 2314 may generate December 25th as the common information corresponding to "Christmas", in the format commonly identifiable by the plurality of NLU models.

For example, when the text includes a plurality of target words corresponding to one common information type, the common information generation module 2314 may select one target word that is to correspond to the common information type, according to a preset criterion, and may generate common information for the selected target word. For example, when text of "Please, tell me the way from Seoul station to Busan station." may include "Seoul station" and "Busan station" as target words corresponding to "location" that is the type of common information. In this case, a common information generation criterion may be set so that a higher priority is given to the destination than to the origin, and the common information generation module 2314 may generate common information for "Busan station", which is the destination, instead of "Seoul station", which is the origin. However, embodiments of the disclosure are not limited thereto, and the common information generation module 2314 may generate a plurality of pieces of common information respectively corresponding to the plurality of target words, and may enable at least one of the plurality of pieces of common information to be selected as common information corresponding to an anaphor included in next text.

For example, the common information generation module 2314 may generate a plurality of pieces of common information corresponding to one target word. For example, for the target word "Christmas" having "Time/Date" as the type of common information, the common information generation module 2314 may generate an identification (ID) value representing "Christmas" and "December 25" as pieces of common information corresponding to "Christmas".

The common information generation module 2314 may store the generated pieces of common information in the common information DB 2341. The common information generation module 2314 may accumulate and store the pieces of common information related to the target word included in the text, according to an order in which text is obtained. For example, the common information generation module 2314 may store the generated common information in association with the type of common information, the domain associated with the generated common information, the target word corresponding to the generated common information, and attributes of the generated common information. At least one of an order in which the common information is stored, the domain associated with the common information, the target word corresponding to the common information, or the attributes of the common information may be used when the common information selection module 2315, which will be described later, selects common information corresponding to an anaphor included in text that is obtained later.

For example, the common information generation module 2314 may store common information corresponding to a preset number of target words for one common information type. For example, when one piece of common information corresponding to a common information type "location" is stored and common information corresponding to another target word corresponding to "location" is generated from text input after the common information corresponding to "location" is stored, the common information generation module 2314 may delete the pre-stored common information and store the common information corresponding to the other target word.

The common information selection module 2315 may select common information for interpreting the second text, from among pieces of common information stored in the common information DB 2341.

When the domain of the second text is identified by the domain identification module 2311, the common information selection module 2315 may select pieces of common information stored in relation to the identified domain from the common information DB 2341, and may provide the selected pieces of common information to a common information transformation module 2331, which will be described in greater detail below. The common information selection module 2315 may provide all of some of the pieces of common information stored in the common information DB 2341 to the common information transformation module 2331, regardless of the domain of the second text. When the common information selection module 2315 selects some of the pieces of common information, the common information selection module 2315 may select a preset number of recently-stored pieces of common information from among the pieces of common information stored in the common information DB 2341 and provide the selected preset number of recently-stored pieces of common information to the common information transformation module 2331. In this case, the common information provided to the common information transformation module 2331 may be transformed by the common information transformation module 2331 and may be input together with the second text to a second NLU model 2332.

According to an embodiment, when an anaphor within the second text is identified by an anaphor identification module 2333, which will be described in greater detail below, the common information selection module 2315 may select common information corresponding to the identified anaphor from the common information DB 2341 and may provide the selected common information to the common information transformation module 2331. In this case, for example, the common information may be transformed and input together with the second text to the second NLU model 2332, or the common information may be used to replace a value corresponding to the anaphor from among output values output by the second NLU model 2332 using the second text as an input.

The common information correction module 2316 may correct the common information stored in the common information DB 2341. The common information correction module 2316 may correct the common information stored in the common information DB 2341, based on the output value of the first NLU model 2313. When a target word is identified from the second text by the target word identification module 2312, common information corresponding to the target word within the second text may be generated by the common information generation module 2315. The common information correction module 2316 may replace the common information stored in the common information DB 2341 with the common information corresponding to the target word within the second text. For example, the common information correction module 2316 may correct common information having the same domain and the some common information type as the domain and the common information type of the target word within the second text. For example, when the first text is "How is the weather in London?", common information corresponding to 'London' as the target word may be stored in the common information DB 2341 in association with the domain 'weather' and the common information type 'location'. Then, second text of "How is the weather in Seoul?" instead of "How is the weather there?" may be input to the first NLU model 2313. In this case, common information corresponding to 'Seoul' as a target word within the second text may be generated in association with the 'weather' domain and the 'location' common information type. The common information correction module 2316 may replace the common information corresponding to 'London' stored in the common information DB 2341 with the common information corresponding to 'Seoul'.

The common information correction module 2316 may correct the common information stored in the common information DB 2341, based on the output value of the second NLU model 2332. The common information correction module 2316 may identify the target word within the text using the output value of the second NLU model 2332, and may determine whether the common information representing the target word is the same as the common information stored in the common information DB 2341. When the common information representing the target word identified by the common information correction module 2316 is different from the common information stored in the common information DB 2341, the common information correction module 2316 may correct the common information stored in the common information DB 2341. In this case, the common information corresponding to the target word may be corrected based on parameters associated with the target word that are output by the second NLU model 2332. For example, the common information corresponding to the target word may be corrected based on the meaning of the target word and the type of common information corresponding to the target word, the meaning and the type being output by the second NLU model 2332. For example, when the first NLU model 2313 outputs the type of common information corresponding to the target word "Seoul" included in the text as "Location" and the second NLU model 2332 outputs the type of common information corresponding to the target word "Seoul" included in the text as "Person", the common information correction module 2316 may add or correct the common information corresponding to the target word "Seoul". In this case, the second NLU model 2332 may be a model specialized for the domain associated with the text, and more accurate common information related to the target word within the text may be stored in the common information DB 2341 by generating or correcting the common information using the second NLU model 2332.

The common information correction module 2316 may add or correct the common information stored in the common information DB 2341, based on data transmitted to or received from the user through a voice assistant service. The common information correction module 2316 may add or correct the common information stored in the common information DB 2341, based on at least one of text generated from the user input, a response message generated through an NLG model 2335, which will be described in greater detail below, or a function of the first electronic device 1000 or another device (not shown) according to an intent of the user. The voice assistant module 2330 may interpret the text generated from the user input and may generate response information for the text. The voice assistant module 2330 is a module specialized for a specific domain, and the second electronic device 2000 may include a plurality of voice assistant modules 2330 for a plurality of domains. The second electronic device 2000 may interpret the text using a voice assistant module 2330 specialized for the domain of the text. For example, when the domain of the text is determined as "Weather" by the domain identification module 2311, a voice assistant module 2330 specialized for the domain "Weather" may be used to interpret the text. When the domain of the text is determined as "Clock" by the domain identification module 2311, a voice assistant module 2330 specialized for the domain "Clock" may be used to interpret the text.

The voice assistant module 2330 may include the common information transformation module 2331, the second NLU model 2332, an anaphor identification module 2333, a response information generation module 2334, and an NLG model 2335.

The common information transformation module 2331 may transform the common information to interpret the second text. The common information transformation module 2331 may transform at least some of the pieces of common information stored in the common information DB 2341 in a format processible by the voice assistant module 2330. The transformed common information may be used to interpret the second text including an anaphor.

The voice assistant module 2330 may interpret the text generated from the user input using the second NLU model 2332. The second NLU model 2332 may output an intent and a parameter associated with an intention of the user by interpreting the text. The intent is information determined by interpreting the text using the second NLU model 2332, and may represent, for example, the intention of the user. The intent may include not only intention information indicating the intention of the user, but also a numerical value corresponding information representing the intention of the user. The numerical value may represent a probability that the text is associated with information indicating a specific intention. For example, when a plurality of pieces of information indicating the intention of the user are obtained as a result of interpreting the text using the second NLU model 2332, intention information having a maximum numerical value from among the plurality of pieces of intention information may be determined as the intent. The parameter may indicate detailed information related to the intent. The parameter is information related to the intent, and a plurality of types of parameters may correspond to one intent.

According to an embodiment, the voice assistant module 2330 may interpret the second text through the second NLU model 2332 without determining whether an anaphor exists in the second text. In this case, the second NLU model 2332 may receive the common information and the second text and may interpret the second text, and the second NLU model 2332 may be an AI model for interpreting text including the anaphor, the AI model being trained using the common information and the text including the anaphor. For example, when it is not determined whether an anaphor exists in the second text, the domain of the second text is identified by the domain identification module 2311, and pieces of common information associated with the domain of the second text are transformed by the common information transformation module 2331, the transformed pieces of common information and the second text may be input to the second NLU model 2332. The second NLU model 2332 may interpret the second text by taking into account the common information corresponding to the anaphor within the second text. For example, when the second text is "How is the weather today there?", common information associated with the weather domain and the second text may be input to the second NLU model 2332, and the second NLU model 2332 may output an intent of 'weather information provision' and parameters such as 'today (date)' and 'Busan (location)'.

When it is not determined whether an anaphor exists in the second text, all or some of the pieces of common information stored in the common information DB 2341 may be transformed by the common information transformation module 2331 regardless of the domain of the second text, and the transformed pieces of common information may be input together with the second text to the second NLU model 2332. Accordingly, the second NLU model 2332 may interpret the second text by taking into account the common information corresponding to the anaphor within the second text. For example, when the second text is "How is the weather today there?", common information recently stored in the common information DB 2341 and the second text may be input to the second NLU model 2332, and the second NLU model 2332 may output an intent of 'weather information provision' and parameters such as 'today (date)' and 'Busan (location)'.

According to an embodiment, the voice assistant module 2330 may identify an anaphor within the second text, and may interpret the second text using common information associated with the identified anaphor.

In this case, the anaphor identification module 2333 may identify the anaphor within the second text by being executed by the processor 2200. For example, the anaphor identification module 2333 may identify the anaphor within the second text, based on a rule. The anaphor identification module 2333 may identify the anaphor within the second text by comparing preset anaphors with the second text. In this case, the preset anaphors may be previously stored in the DB 2340 in order to identify the anaphor within the second text.

The anaphor identification module 2333 may identify the anaphor within the second text using an AI model for anaphor identification. In this case, the AI model for anaphor identification may be a model pre-trained to identify an anaphor, and the anaphor identification module 2333 may identify an anaphor included in the second text, based on an output value output by the AI model for anaphor identification. For example, when the second text is input to the AI model for anaphor identification, a parameter 'there (anaphor)' may be output from the AI model, and the anaphor identification module 2333 may identify that 'there (anaphor)' within the text is an anaphor, from the output parameter 'there (anaphor)'. The AI model for anaphor identification may include, but is not limited to, the first NLU model 2313, the second NLU model 2332, or a separate model (not shown).

When the anaphor within the second text is identified by the anaphor identification module 2333, the common information selection module 2315 may select common information related to the identified anaphor and may provide the selected common information to the common information transformation module 2331.

In this case, the common information selection module 2315 may select the common information corresponding to the anaphor identified from the text from among the pieces of common information stored in the common information DB 2341. The common information selection module 2315 may identify the common information indicating the anaphor included in the text from the common information DB 2341, based on the type of common information related to the anaphor and/or the domain associated with the text. For example, when the common information for "location" of the "Weather" domain generated from the first text is a GPS coordinate value of London and the anaphor included in the second text obtained after the first text is "there", the common information selection module 2315 may select the GPS coordinate value of London, which is common information corresponding to the anaphor "there", from the common information DB 2341, based on the common information type "location".

The common information selection module 2315 may identify the target word corresponding to the anaphor, and may select common information corresponding to the target word. In this case, the common information selection module 2315 may select the target word corresponding to the anaphor from among target words identified from texts obtained before the second text is obtained. The common information selection module 2315 may select common information corresponding to the selected target word. However, embodiments of the disclosure are not limited thereto, and the common information selection module 2315 may select the common information according to various criteria by taking into account at least one of an order i which common information is stored, a domain associated with the common information, a target word corresponding to the common information, or attributes of the common information.

For example, when a plurality of pieces of common information associated with the target word are stored in the common information DB 2341, the common information selection module 2315 may select common information corresponding to a target word included in next text from among the stored plurality of pieces of common information. In this case, the common information selection module 2315 may select common information corresponding to the anaphor included in the text from the plurality of pieces of common information stored in the common information DB 2341, by taking into account the output value of the second NLU model 2332, which will be described later.

The common information selected by the common information selection module 2315 may be transformed in a format usable by the voice assistant module 2330, which will be described later. For example, when it is hard for the voice assistant module 2330 to use the common information selected by the common information selection module 2315 without changes, the common information selected by the common information selection module 2315 may be transformed in the format usable by the voice assistant module 2330.

According to an embodiment, the voice assistant module 2330 may input the common information and the second text to the second NLU model 2332 to interpret the second text. The voice assistant module 2330 may input the second text and the common information corresponding to the anaphor within the second text to the second NLU model 2332 and may obtain the output value output by the second NLU model 2332. In this case, the second NLU model 2332 may input the second text and the common information corresponding to the anaphor within the second text and may interpret the second text, and the second NLU model 2332 may be an AI model for interpreting the text including the anaphor, the AI model being trained using the common information corresponding to the anaphor and the text including the anaphor. For example, when the common information corresponding to the anaphor within the second text is transformed by the common information transformation module 2331, the transformed common information and the second text may be input to the second NLU model 2332. The second NLU model 2332 may interpret the second text by taking into account the common information corresponding to the anaphor within the second text. For example, when the second text is "How is the weather today there?", common information corresponding to 'there' and the second text may be input to the second NLU model 2332, and the second NLU model 2332 may output an intent of 'weather information provision' and parameters such as 'today (date)' and 'Busan (location)'.

Although it has been described above that both the second text and the common information corresponding to the anaphor within the second text are input to the second NLU model 2332, embodiments of the disclosure are not limited thereto. For example, the anaphor within the second text may be replaced by the common information, and the second text of which the anaphor has been replaced by the common information may be input to the second NLU model 2332.

According to an embodiment, the voice assistant module 2330 may input the second text to the second NLU model 2332, and may replace a parameter corresponding to the anaphor from among the parameters output by the second NLU model 2332 with the common information corresponding to the anaphor. In this case, the second NLU model 2332 may be an AI model that receives the second text and interprets the second text. For example, when the second text is "How is the weather today there?", the second text may be input to the second NLU model 2332, and the second NLU model 2332 may output an intent of 'weather information provision' and parameters such as 'today (date)' and 'there (anaphor)'. The voice assistant module 2330 may replace the parameter 'there (anaphor)' representing the anaphor with 'Busan (location)'.

The response information generation module 2334 may generate response information for the text, based on a result of interpreting the second text. The response information is data associated with a response to the text, and thus may include, for example, data provided to the first electronic device 1000), another device (not shown), and another server (not shown) and data for an operation of the second electronic device 2000.

The response information generation module 2334 may plan actions of the second electronic device 2000, the first electronic device 1000, or the other device (not shown) according to the intention of the user, based on the output value of the second NLU model 2332. For example, the response information generation module 2334 may plan actions of the second electronic device 2000, the first electronic device 1000, or the other device (not shown) according to the intention of the user, using uttered data stored in an uttered data DB 2342, which will be described later, and action data stored in an action data DB 2343, which will be described in greater detail below, as a result of interpreting the text. The response information generation module 2334 may generate response information for the text by planning the actions of the second electronic device 2000, the first electronic device 1000, or the other device (not shown) according to the intention of the user.

For example, the response information generation module 2334 may generate a response message based on the intention of the user, using the NLG model 2335. For example, the response information generation module 2334 may obtain a response content that is to be provided to the user, such as text, an image, or a moving picture. For example, the response information generation module 2334 may determine operations of the first electronic device 1000 or the other device (not shown) of the user and may generate a control command for controlling the first electronic device 1000 or the other device (not shown).

The DB 2340 may store necessary information for a voice assistant service. The DB 2340 may include the common information DB 2341, the uttered data DB 2342, and the action data DB 2343.

The common information DB 2341 may store common information corresponding to a target word. The common information DB 2341 may accumulate and store the common information related to the target word included in the text, according to an order in which the text is obtained. For example, the common information DB 2341 may store generated common information in association with the type of common information, the domain associated with the common information, the target word corresponding to the common information, and attributes of the common information.

The uttered data DB 2342 may store uttered data associated with the functions of the first electronic device 1000 and the other device (not shown). The stored uttered data may be used to identify the functions of the first electronic device 1000 and the other device (not shown) associated with a result of interpreting the text.

The action data DB 2343 may store action data associated with the the functions of the first electronic device 1000 and another first electronic device 1000. The action data may be data about a series of detailed operations of the first electronic device 1000 corresponding to certain uttered data. For example, the action data may include information related to the detailed operations to be performed by the first electronic device 1000 in correspondence with the certain uttered data, a correlation between each of the detailed operations and another detailed operation, and an order of executing the detailed operations. The correlation between each of the detailed operations and the other detailed operation includes information about the other detailed operation that is to be performed before one detailed operation is performed, in order to perform the detailed operation. For example, when an operation that is to be performed is "music playback", "power on" may be another detailed operation that is to be performed before the operation "music playback". The action data may also include, but is not limited to, functions to be performed by a target device to perform a specific operation, an order of executing the functions, an input value necessary for performing the functions, and an output value output as a result of performing the functions. The uttered data stored in the uttered data DB 2342 and the action data stored in the action data DB 2343 may be mapped with each other, and may be used by the second electronic device 2000 to plan operations of the second electronic device 2000, operations of the first electronic device 1000, and operations of the other device (not shown) related to the intention of the user from the result of interpreting the text.

In FIG. 2, the second electronic device 2000 manages the common information corresponding to the target word, based on the text based on the input of the user from the first electronic device 1000 and provides a voice assistant service. However, embodiments of the disclosure are not limited thereto. For example, the second electronic device 2000 may manage the common information corresponding to the target word within the text based on the input of the user input to the first electronic device 1000 and provide a voice assistant service, without receiving the text from the first electronic device 1000. The second electronic device 2000 may be a server device or a device of the user, and at least some of the operations of the second electronic device 2000 in FIG. 2 may be performed by the first electronic device 1000. When the second electronic device 2000 is a device of the user, the second electronic device 2000 may further include, for example, a user input interface (not shown), a display (not shown), and a sensor unit (not shown).

FIG. 3 illustrates generation of common information from the first text by the common information management module 2312, according to an embodiment of the disclosure.

Referring to FIG. 3, when "How is the weather in London?", which is the first text based on the user input, is received by the second electronic device 2000, the common information management module 2312 of the second electronic device 2000 may input the first text to the first NLU model 2313, and may identify the domain and target word of the first text, based on the output value output by the first NLU model 2313. For example, the common information management module 2312 may identify that the domain of "How is the weather in London?" is "Weather", the target word is "London", and the type of common information is "Geo". The common information management module 2312 may generate a value representing a GPS coordinate of London as common information corresponding to the target word "London".

FIG. 4 is a table showing domains corresponding to texts including target words, according to an embodiment of the disclosure.

Referring to FIG. 4, domains of "How is the weather in Busan?", "What's the temperature in LA now?", and "Please, tell me the weather on Sunday." may be identified as "Weather", domains of "Please, tell me the time in Shanghai." and "What time is it now in Brazil?" may be identified as "Clock", and domains of "Please, find a famous restaurant in London." and "Please, tell me a restaurant that opens tomorrow." may be identified as "Restaurant".

Common information types corresponding to target words "Busan", "LA", "Shanghai", "Brazil", and "London" may be identified as "location", and common information types corresponding to target words "Tomorrow" and "Sunday" may be identified as "date".

Common information corresponding to a target word may be generated, and the generated common information may be classified according to domains or common information types and may be stored.

FIG. 5 is a table showing common information corresponding to a target word, according to an embodiment of the disclosure.

Referring to FIG. 5, as common information corresponding to target words "20.04.19" and "2020/04/19" "common.BaseDate{year{common.Integer(2020)}, month{common.Integer(4)}, day {common.Integer(19)}}" may be generated, and, as common information corresponding to target words "L.A." and "Los Angeles", "common.BaseGeo Point {latitude {common.decimal (34.052235)}, longitude{common.decimal(−118.243683)}}" may be generated. The common information of FIG. 5 may have a format commonly identifiable by a plurality of voice assistant modules.

Figure 6:
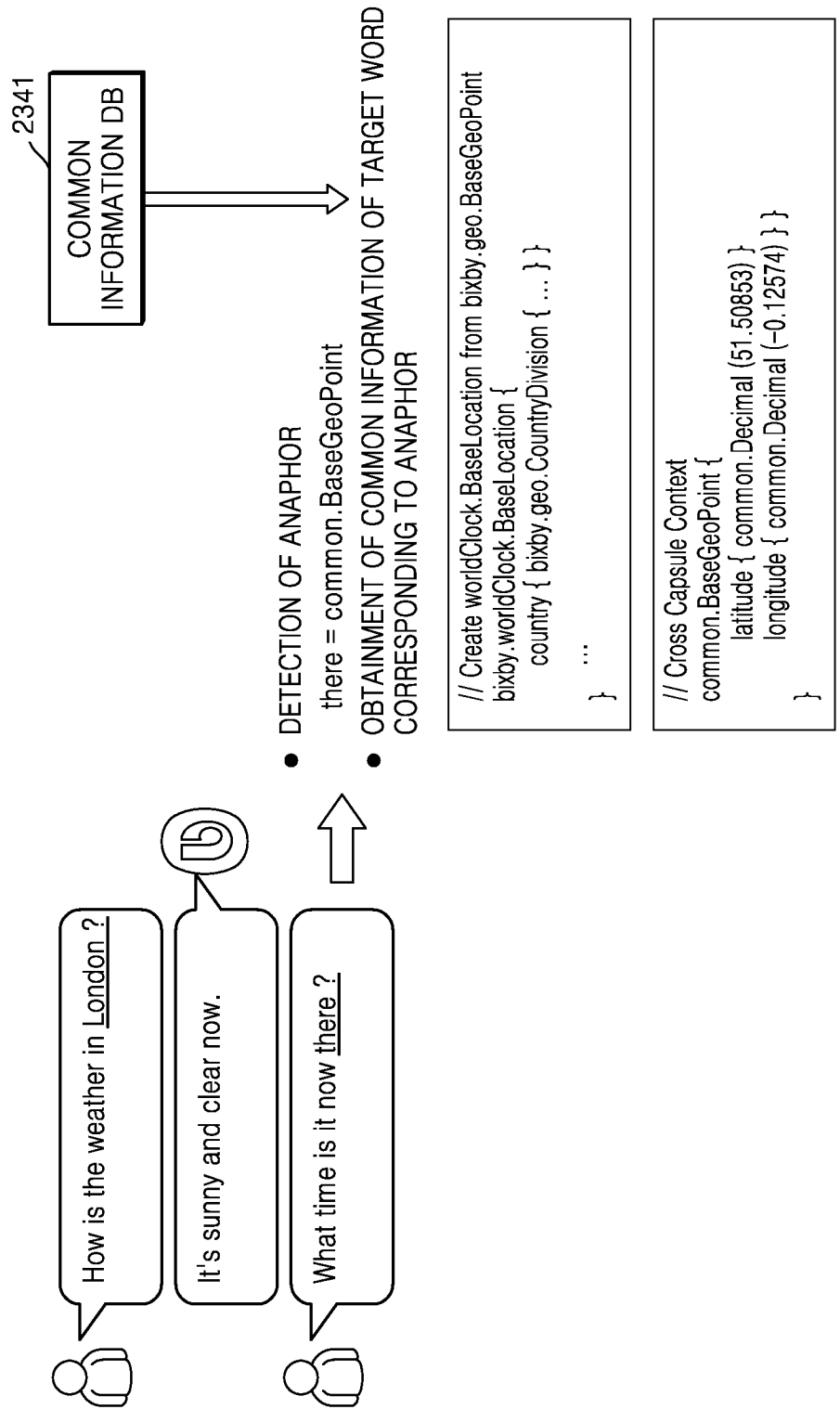
FIG. 6 illustrates obtainment of common information corresponding to an anaphor within second text, according to an embodiment of the disclosure.

FIG. 6 illustrates obtainment of common information corresponding to an anaphor within the second text, according to an embodiment of the disclosure.

Referring to FIG. 6, when the first text of "How is the weather in London?" of the user is received from the first electronic device 1000, the second electronic device 2000 may generate common information corresponding to the target word "London" within the first text and may store the generated common information in the common information DB 2343.

Thereafter, when the first electronic device 1000 outputs "It's sunny and clear now." as a response to the first text, the user may input an inquiry of "What time is it now there?" to the first electronic device 1000. Then, when the first electronic device 1000 provides the second text of "What time is it now there?" to the second electronic device 2000, the second electronic device 2000 may detect "there" as an anaphor within the second text, and extract common information corresponding to the detected anaphor from the common information DB 2343 to interpret the meaning of the second text.

Figure 7:
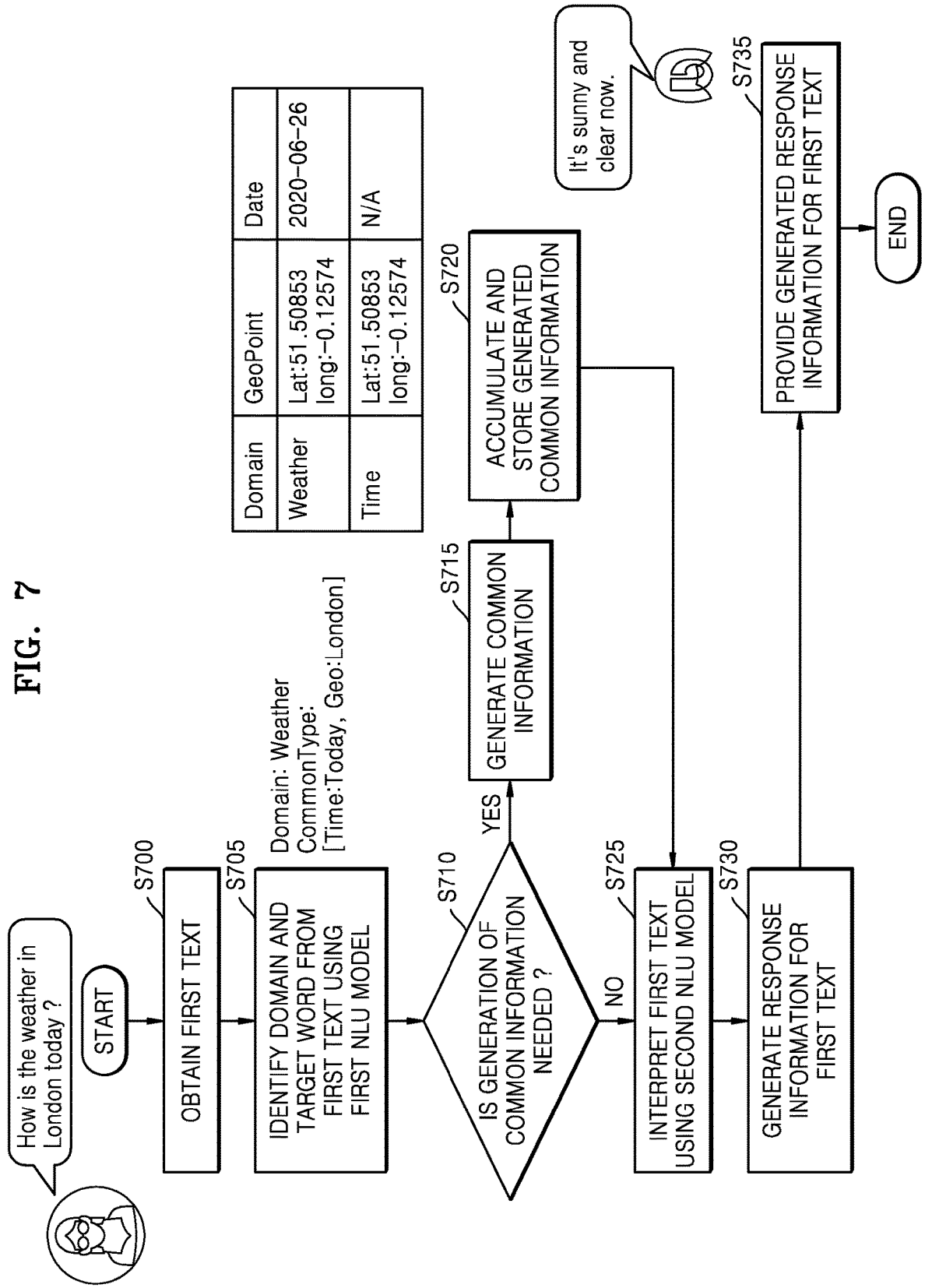
FIG. 7 is a flowchart of a method, performed by the second electronic device, of generating common information for the first text and providing a response to the first text, according to an embodiment of the disclosure.

FIG. 7 is a flowchart of a method, performed by the second electronic device 2000, of generating common information for the first text and providing a response to the first text, according to an embodiment of the disclosure.

In operation S700, the second electronic device 2000 may obtain the first text of the user. The first electronic device 1000 of the user using a voice assistant service may receive a first voice input of the user and may transform the received first voice input into the first text. The first electronic device 1000 may transmit the first text to the second electronic device 2000, and the second electronic device 2000 may receive the first text from the first electronic device 1000. For example, when the user inputs a voice of "How is the weather in London today?" to the first electronic device 1000, the first electronic device 1000 may transform the voice of the user into the first text of "How is the weather in London today?" and may provide the first text to the second electronic device 2000. When the user inputs first text to the first electronic device 1000, the first electronic device 1000 may provide the first text input by the user to the second electronic device 2000, and the second electronic device 2000 may receive the first text from the first electronic device 1000.

The second electronic device 2000 may obtain the first text from a voice input of the user for the second electronic device 2000. In this case, the second electronic device 2000 may be a device of the user rather than a server.

In operation S705, the second electronic device 2000 may identify a domain, a target word, and information related to the target word from the first text using the first NLU model 2313.

The second electronic device 2000 may identify the domain of the first text by analyzing the first text of the user input using the first NLU model 2313. The second electronic device 2000 may identify the domain of the first text, based on the output value output by the first NLU model 2313. For example, the first text of "How is the weather in London today?" may be input to the first NLU model 2313, an output value indicating that the domain of the first text is "Weather" may be output by the first NLU model 2313, and the second electronic device 2000 may identify that the domain of the first text is "Weather", based on the output value output by the first NLU model 2313.

The second electronic device 2000 may identify the target word within the text and the information related to the target word. The second electronic device 2000 may identify the target word and the type of common information corresponding to the target word by analyzing the first text of the user using the first NLU model 2313. The second electronic device 2000 may identify the target word and the type of common information corresponding to the target word, based on the output value output by the first NLU model 2313. For example, when the first text of "How is the weather in London today?" is input to the first NLU model 2313, an output value indicating that the target word within the first text is "London" and the type of common information of "London" is "location" may be output by the first NLU model 2313, and the second electronic device 2000 may identify that the target word within the first text is "London" and the type of common information corresponding to "London" is "location", based on the output value output by the first NLU model 2313.

In operation S710, the second electronic device 2000 may determine whether generation of the common information for the target word within the first text is needed. The second electronic device 2000 may determine whether generation of the common information for the target word within the first text is needed, by taking into account whether the target word is included in the first text, the meaning of texts input before the first text, and the common information stored in the common information DB 2343. For example, when it is determined that the target word included in the first text and the common information corresponding to the target word are not stored in the common information DB 2343, the second electronic device 2000 may determine the common information corresponding to the target word within the first text to be stored. When it is determined that the target word included in the first text and the common information corresponding to the target word have already been stored in the common information DB 2343, the second electronic device 2000 may determine the common information corresponding to the target word within the first text to be not stored.

When it is determined in operation S710 that generation of the common information is needed, the second electronic device 2000 may generate common information corresponding to the target word, in operation S715. The second electronic device 2000 may generate, as the common information, detailed data indicating the target word, and the common information may be generated according to a format commonly identifiable by the plurality of voice assistant modules 2330. For example, when the target word is "London" and the type of common information is "location", the second electronic device 2000 may generate a GPS coordinate value indicating the location of London as the common information corresponding to "London", in a format commonly identifiable by a plurality of NLU models. For example, when the target word is "Tom" and the type of common information is "person", the second electronic device 2000 may generate an identifier of "Tom" as the common information corresponding to "Tom", in the format commonly identifiable by the plurality of NLU models. For example, when the target word is "Christmas" and the type of common information is "Time/Date", the second electronic device 2000 may generate December 25th as the common information corresponding to "Christmas", in the format commonly identifiable by the plurality of NLU models.

For example, when the text includes a plurality of target words corresponding to one common information type, the second electronic device 2000 may select one target word that is to correspond to the common information type, according to a preset criterion, and may generate common information about the selected target word. For example, when text of "Please, tell me the way from Seoul station to Busan station." may include "Seoul station" and "Busan station" as target words corresponding to "location" that is the type of common information. In this case, a common information generation criterion may be set so that a higher priority is given to the destination than to the origin, and the second electronic device 2000 may generate common information for "Busan station", which is the destination, instead of "Seoul station", which is the origin. However, embodiments of the disclosure are not limited thereto, and the second electronic device 2000 may generate a plurality of pieces of common information respectively corresponding to the plurality of target words, and may enable at least one of the plurality of pieces of common information to be selected as common information corresponding to an anaphor included in next text.

For example, the second electronic device 2000 may generate a plurality of pieces of common information corresponding to one target word. For example, for the target word "Christmas" having "Time/Date" as the type of common information, the common information generation module 2314 may generate "December 25" and an ID value representing "Christmas" as pieces of common information corresponding to "Christmas".

In operation S720, the second electronic device 2000 may accumulate and store the generated common information. The second electronic device 2000 may store the generated common information in the common information DB 2341. The second electronic device 2000 may accumulate and store the common information associated with the target word included in the text, according to an order in which the text is obtained. For example, the second electronic device 2000 may store the generated common information in association with the type of common information, the domain associated with the common information, the target word corresponding to the common information, and attributes of the common information.

For example, the second electronic device 2000 may store common information corresponding to a preset number of target words for one common information type. For example, when one piece of common information corresponding to "location" as the type of common information is stored and common information corresponding to another target word corresponding to "location" is generated from text input after the common information corresponding to "location" is stored, second electronic device 2000 may delete previously-stored common information and store the common information corresponding to the other target word.

In operation S725, the second electronic device 2000 may interpret the first text using the second NLU model 2332.

The second electronic device 2000 may input the first text to the second NLU model 3332 and may obtain an intent and a parameter from the second NLU model 2332. The second electronic device 2000 may interpret the first text, based on an intent representing an intention of the user and a parameter representing detailed information associated with the intent. When an anaphor is included in the first text, the second electronic device 2000 may interpret the first text using common information generated from text obtained before the first text.

The second electronic device 2000 may select the voice assistant module 2330 specialized for the domain of the first text, and may control the selected voice assistant module 2330 to interpret the first text. The second electronic device 2000 may interpret the first text using the second NLU model 2332 within the voice assistant module 2330 specialized for the domain of the first text.

When it is determined in operation S710 that generation of the common information is not needed, the second electronic device 2000 may interpret the first text using the second NLU model 2332 without generating the common information for the first text, in operation S725.

In operation S730, the second electronic device 2000 may generate response information for the first text. The second electronic device 2000 may generate the response information for the text, based on a result of interpreting the first text. The response information is data associated with a response to the text, and thus may include, for example, data provided to the first electronic device 1000), another device (not shown), and another server (not shown) and data for an operation of the second electronic device 2000. The second electronic device 2000 may plan the actions of the second electronic device 2000, the first electronic device 1000, or the other device (not shown) according to the intention of the user, based on the output value of the second NLU model 2332. For example, the second electronic device 2000 may plan the actions of the second electronic device 2000, the first electronic device 1000, or the other device (not shown) according to the intention of the user, using the uttered data stored in the uttered data DB 2342 and the action data stored in the action data DB 2343, as a result of interpreting the first text. The second electronic device 2000 may generate the response information for the text by planning the actions of the second electronic device 2000, the first electronic device 1000, or the other device (not shown) according to the intention of the user.

For example, the second electronic device 2000 may generate the response message according to the intention of the user, using the NLG model 2335. For example, the second electronic device 2000 may obtain a response content that is to be provided to the user, such as text, an image, or a moving picture. For example, the second electronic device 2000 may determine the operations of the first electronic device 1000 or the other device (not shown) of the user and may generate a control command for controlling the first electronic device 1000 or the other device (not shown).

In operation S735, the second electronic device 2000 may provide the generated response information. The second electronic device 2000 may provide the generated response information to at least one of the first electronic device 1000, the other device (not shown), or the other server (not shown). In response to the response information, the first electronic device 1000 and the other device (not shown) may perform an operation based on the response information. For example, when the response information is a response message, the first electronic device 1000 and the other device (not shown) may output the response message. For example, when the response message is a control command, the first electronic device 1000 and the other device (not shown) may perform a function according to the control command. For example, in response to the response information, the other server (not shown) may control the first electronic device 1000 and the other device (not shown) according to the response information.

Figure 8:
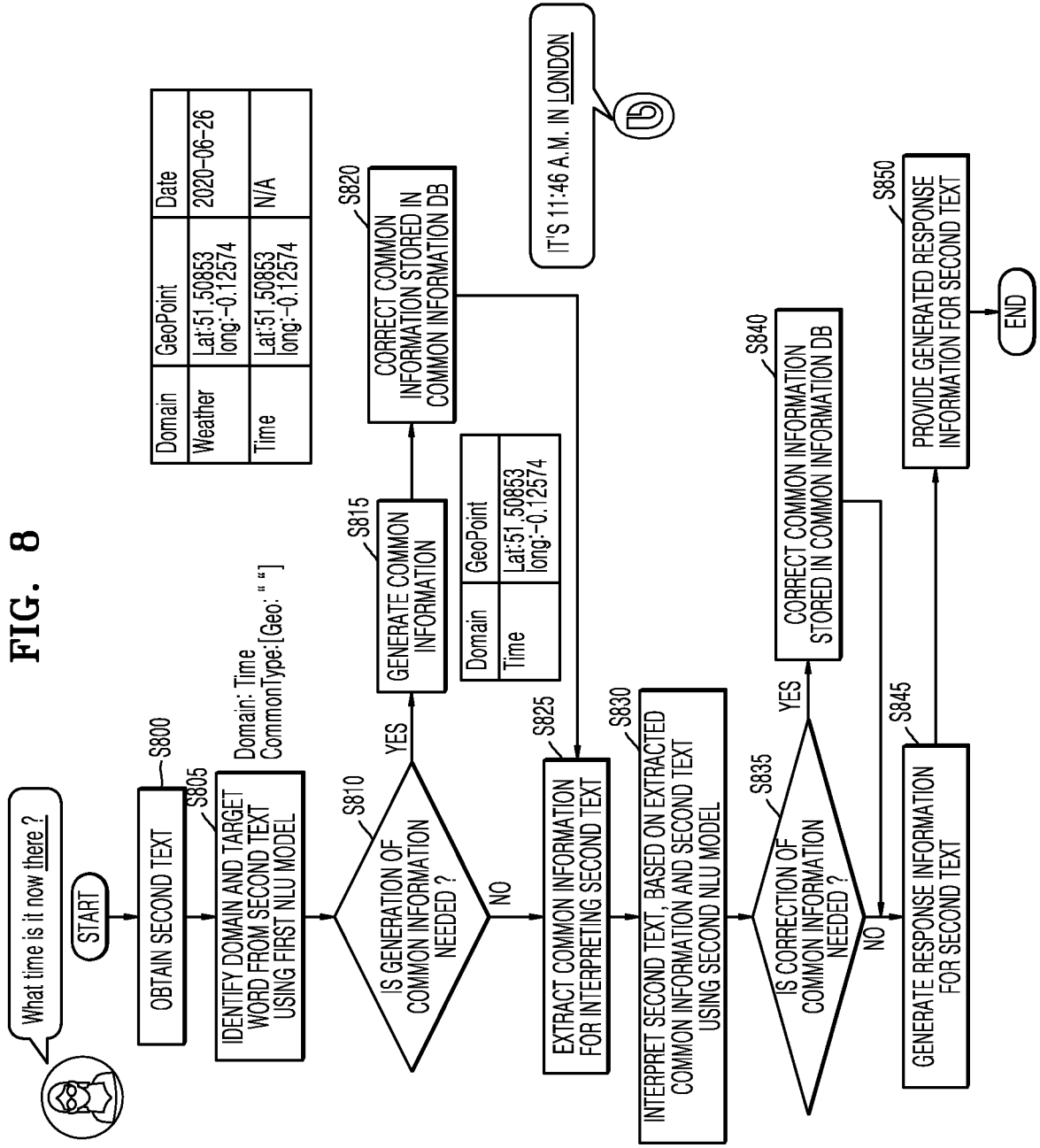
FIG. 8 is a flowchart of a method, performed by the second electronic device, of generating common information for the second text and providing a response to the second text, according to an embodiment of the disclosure.

FIG. 8 is a flowchart of a method, performed by the second electronic device 2000, of generating common information for the second text and providing a response to the second text, according to an embodiment of the disclosure.

In operation S800, the second electronic device 2000 may obtain the second text of the user. The first electronic device 1000 may receive a second voice of the user after receiving a first voice of the user, and may transform the received second voice into the second text. The first electronic device 1000 may transmit the second text to the second electronic device 2000, and the second electronic device 2000 may receive the second text from the first electronic device 1000. For example, the user may input a second voice of "What time is it now there?" to the first electronic device 1000 after a first voice of "How is the weather in London?", the first electronic device 1000 may transform the second voice of the user into a second text of "Where are you now?" and may provide the second text to the second electronic device 2000. When the user inputs second text to the first electronic device 1000, the first electronic device 1000 may provide the second text input by the user to the second electronic device 2000, and the second electronic device 2000 may receive the second text from the first electronic device 1000.

The second electronic device 2000 may obtain the second text from a voice input of the user for the second electronic device 2000. In this case, the second electronic device 2000 may be a device of the user rather than a server.

In operation S805, the second electronic device 2000 may identify a domain and a target word from the second text using the first NLU model 2313. The second electronic device 2000 may identify the domain of the second text by analyzing the second text of the user input using the first NLU model 2313. The second electronic device 2000 may identify the domain of the second text, based on the output value output by the first NLU model 2313. For example, the second text of "What time is it now there?" may be input to the first NLU model 2313, an output value indicating that the domain of the second text is "Time" may be output by the first NLU model 2313, and the second electronic device 2000 may identify that the domain of the second text is "Time", based on the output value output by the first NLU model 2313.

The second electronic device 2000 may identify a target word within the second text and information related to the target word. The second electronic device 2000 may identify the target word and the type of common information corresponding to the target word by analyzing the second text of the user using the first NLU model 2313. The second electronic device 2000 may identify the target word and the type of common information corresponding to the target word, based on the output value output by the first NLU model 2313. For example, when the second text of "What time is it now there?" is input to the first NLU model 2313, an output value indicating that the first text includes no target words may be output by the first NLU model 2313, and the second electronic device 2000 may identify that the first text includes no target words, based on the output value output by the first NLU model 2313.

When the second text of "Is December 25 a public holiday there?" is input to the first NLU model 2313, an output value indicating that a target word within the second text is "December 25" and the type of common information of "December 25" is "date" may be output by the first NLU model 2313, and the second electronic device 2000 may identify that the target word within the second text is "December 25" and the type of common information corresponding to "December 25" is "date", based on the output value output by the first NLU model 2313.

In operation S810, the second electronic device 2000 may determine whether generation of common information is necessary. The second electronic device 2000 may determine whether generation of common information for the target word within the second text is needed, by taking into account whether the target word is included in the second text, the meaning of texts input before the second text, and the common information stored in the common information DB 2343. For example, when the second text includes no target words, the second electronic device 2000 may determine the common information to be not generated. For example, when common information corresponding to the same target word as the target word within the second text has already been stored in the common information DB 2343, the second electronic device 2000 may determine the common information to be not generated. For example, when the target word within the second text is a new target word, the second electronic device 2000 may determine the common information to be generated.

When it is determined in operation S810 that generation of the common information is needed, the second electronic device 2000 may generate the common information corresponding to the target word within the second text, in operation S815. The second electronic device 2000 may generate, as the common information, detailed data indicating the target word, and the common information may be generated according to the format commonly identifiable by the plurality of voice assistant modules 2330.

For example, second text of "How is the weather in Seoul?" instead of "How is the weather there?" may be input to the first NLU model 2313. In this case, common information corresponding to a target word 'Seoul' within the second text may be generated in association with the weather domain and the location common information type.

In operation S820, the second electronic device 2000 may add or correct the common information stored in the common information DB 2343. The second electronic device 2000 may add the common information corresponding to the target word within the second text to the common information DB 2343. For example, when the target word within the second text is a new word, the second electronic device 2000 may accumulate and store the common information corresponding to the target word within the second text in previously-stored common information according to the order in which the second text is obtained.

For example, the second electronic device 2000 may delete a portion of the common information stored in the common information DB 2343. When the number of pieces of common information to be stored in the common information DB 2343 is preset and the preset number of pieces of common information have already been stored in the common information DB 2343, the second electronic device 2000 may delete earliest-stored common information from among the pieces of common information stored in the common information DB 2343 in order to store the common information corresponding to the target word within the second text.

For example, the second electronic device 2000 may replace the common information stored in the common information DB 2343 with the common information corresponding to the target word within the second text. When the same type of common information as the common information of the target word within the second text is stored in the common information DB 2343, the second electronic device 2000 may replace the same type of common information stored in the common information DB 2343 with the common information of the target word within the second text.

For example, when the first text is "How is the weather in London?", common information corresponding to a target word of 'London' may be stored in association with the weather domain and the location common information type in the common information DB 2341, and then, common information corresponding to a target word 'Seoul' within the second text of "How is the weather in Seoul?" instead of "How is the weather there?" may be generated in association with the weather domain and the location common information type. The second electronic device 2000 may replace the common information corresponding to 'London' stored in the common information DB 2341 with the common information corresponding to 'Seoul'.

However, a criterion according to which the second electronic device 2000 adds the common information corresponding to the target word within the second text to the common information DB 2343 is not limited thereto. According to various other criteria, the common information DB 2343 may be corrected.

In operation S825, the second electronic device 2000 may extract the common information for interpreting the second text.

According to an embodiment, the second electronic device 2000 may extract pieces of common information stored in relation to the domain of the second text from the common information DB 2341. The second electronic device 2000 may extract, from the common information DB 2343, pieces of common information corresponding to the same domain as the domain of the second text identified in operation S805, based on the domain of the second text. For example, when the domain of the second text is "time", the second electronic device 2000 may extract, from the common information DB 2343, pieces of common information corresponding to the domain "time" from among the pieces of common information stored in the common information DB 2343.

According to an embodiment, the second electronic device 2000 may extract, from the common information DB 2343, all or some of the pieces of common information stored in the common information DB 2341, regardless of the domain of the second text. In this case, the second electronic device 2000 may extract a preset number of recently-stored pieces of common information from among the pieces of common information stored in the common information DB 2341, but embodiments of the disclosure are not limited thereto.

According to an embodiment, the second electronic device 2000 may extract only common information corresponding to the anaphor within the second text from the common information DB 2343. An output value output by the first NLU model 2313 in operation S805 may include an anaphor and the type of common information corresponding to the anaphor. In this case, the second electronic device 2000 may identify the anaphor within the second text and the type of common information corresponding to the anaphor, based on the output value output by the first NLU model 2313. For example, when "there" and "location" are output by the first NLU model 2313, the second electronic device 2000 may identify that the anaphor within the second text is "there" and the type of common information corresponding to the anaphor "there" is "location". The second electronic device 2000 may extract from the common information DB 2343 pieces of common information having the same common information type as the type of common information corresponding to the anaphor within the second text. For example, the second electronic device 2000 may extract common information of which the type is classified into "location" from the common information DB 2343.

In operation S830, the second electronic device 2000 may interpret the second text using the second NLU model 2332.

According to an embodiment, the second electronic device 2000 may input the extracted common information and the second text to the second NLU model 2332. The second electronic device 2000 may transform the extracted common information in a format suitable for the second NLU model 2332, and may input the transformed common information together with the second text to the second NLU model 2332. In this case, the second NLU model 2332 may be a model trained to interpret the meaning of text including an anaphor, based on the text including the anaphor and the common information, and the second NLU model 2332 may output a result of the interpretation of the second text as the output value, as the output value, by taking into account the meaning of the common information corresponding to the anaphor. For example, the pieces of common information stored in the common information DB 2343 and the second text of "What time is it now there?" are input to the second NLU model 2332, an intent and parameters obtained by interpreting the second text may be output by the second NLU model 2332 by taking into account a GPS coordinate value of a target word "London" within the first text.

According to an embodiment, the second electronic device 2000 may input the second text and replace a value corresponding to the anaphor from among output values output by the second NLU model 2332 with the extracted common information. In this case, the second NLU model 2332 may be a model trained to input text and interpret the meaning of the text, and the second NLU model 2332 may output a result of the interpretation of the second text as the output value, by not considering the meaning of the common information corresponding to the anaphor. The second electronic device 2000 may replace a value corresponding to the anaphor from among the output values output by the second NLU model 2332 with the extracted common information. In this case, the extracted common information may be transformed in a format that the output value of the second NLU model 2332 has, and the transformed common information may replace the value corresponding to the anaphor from among the output values output by the second NLU model 2332. For example, when the second text of "What time is it now there?" is input to the second NLU model 2332, an intent and parameters may be output as a result of the interpretation of the second text by the second NLU model 2332, a parameter related to the anaphor "there" from among the intent and the parameters output by the second NLU model 2332 may be replaced by the GPS coordinate value of "London" corresponding to "there".

In operation S835, the second electronic device 2000 may determine whether correction of the common information is needed. When it is determined the correction of the common information is needed, the second electronic device 2000 may correct the common information DB 2341, in operation S840.

The second electronic device 2000 may determine whether correction of the common information stored in the common information DB 2341 is needed, based on the output value of the second NLU model 2332. The second electronic device 2000 may identify the target word within the text using the output value of the second NLU model 2332, and may determine whether the common information representing the target word is the same as the common information stored in the common information DB 2341. When the common information representing the target word identified by the second electronic device 2000 is different from the common information stored in the common information DB 2341, the common information correction module 2316 may correct the common information stored in the common information DB 2341. In this case, the common information corresponding to the target word may be corrected based on parameters associated with the target word that are output by the second NLU model 2332. For example, the second electronic device 2000 may add or correct the common information corresponding to the target word from among the pieces of common information stored in the common information DB 2343, based on the meaning of the target word and the type of common information corresponding to the target word, the meaning and the type being output by the second NLU model 2332. For example, when the first NLU model 2313 outputs the type of common information corresponding to the target word "Seoul" included in the second text as "Location" and the second NLU model 2332 outputs the type of common information corresponding to the target word "Seoul" included in the second text as "Person", the second electronic device 2000 may correct the common information corresponding to the target word "Seoul". In this case, the second NLU model 2332 may be a model specialized for the domain of the second text, and the second electronic device 2000 may generate or correct the common information using the second NLU model 2332, so that more accurate common information related to the target word within the second text may be stored in the common information DB 2341.

The second electronic device 2000 may correct the common information stored in the common information DB 2341 in operation S840, based on data transmitted to or received from the user through a voice assistant service. The common information correction module 2316 may correct the common information stored in the common information DB 2341, based on at least one of text generated from the user input, a response message generated through the NLG model 2335, which will be described later, or a function of the first electronic device 1000 or another device (not shown) according to the intention of the user.

In operation S845, the second electronic device 2000 may generate response information for the second text. In operation S850, the second electronic device 2000 may provide the generated response information. Operations S845 and S850 corresponding to operations S730 and S735, and thus detailed descriptions thereof may not be repeated here for convenience of explanation.

Figure 9:
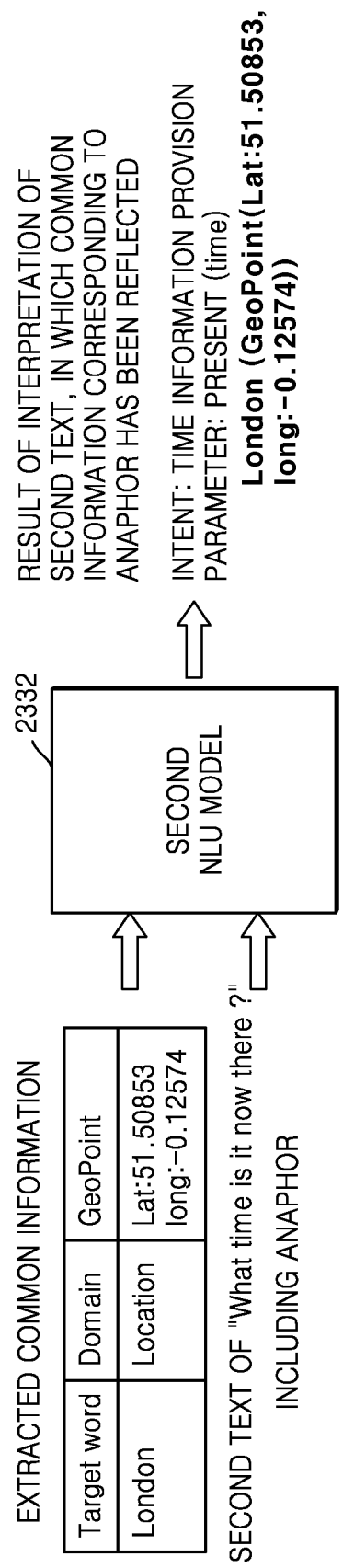
FIG. 9 illustrates output of a result of interpretation of the second text in consideration of common information by a second NLU model, according to an embodiment of the disclosure.

FIG. 9 illustrates output of a result of interpretation of the second text in consideration of the common information by the second NLU model 2332, according to an embodiment of the disclosure.

Referring to FIG. 9, when the second text of "What time is it now there?" including an anaphor and extracted common information are input to the second NLU model 2332, the second NLU model 2332 may output an intent and parameters representing a result of interpretation of the second text, in which common information corresponding to the anaphor has been reflected. For example, the second NLU model 2332 may output 'time information provision' as the intent and 'present (time)' and 'London (GeoPoint (Lat:51.50853, long:−0.12574))' as the parameters. Although the extracted common information is input to the second NLU model 2332 without changes in FIG. 9, embodiments of the disclosure are not limited thereto. The extracted common information may be pre-processed in a format interpretable by the second NLU model 2332, and the pre-processed common information may be input to the second NLU model 2332. Although the GPS value of London is output by the second NLU model 2332 without changes in FIG. 9, embodiments of the disclosure are not limited thereto. In order for the second electronic device 2000 to provide the user with a voice assistant service, a value of a preset format for use as a result of interpreting text may be output by the second NLU model 2332.

Figure 10:
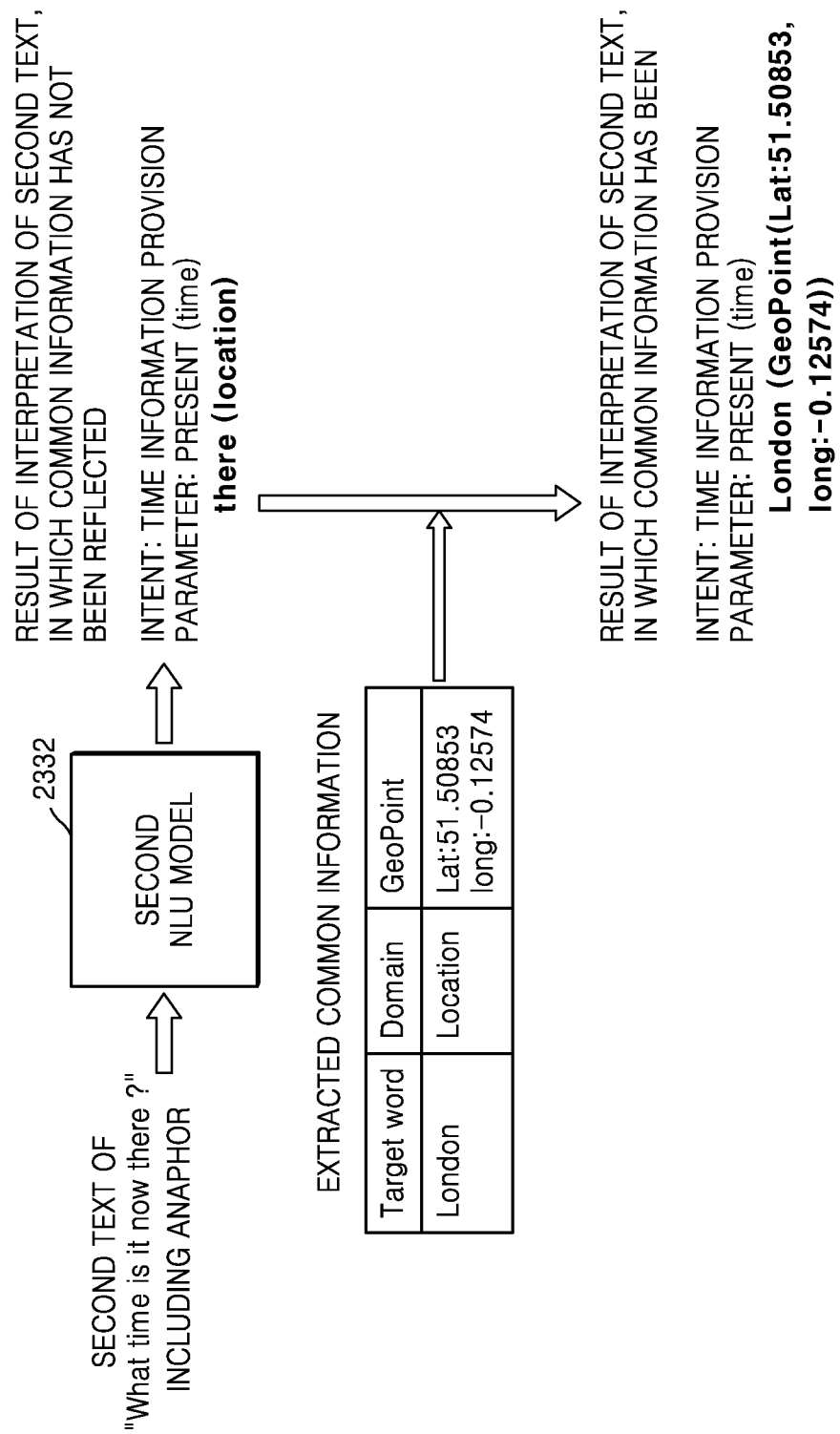
FIG. 10 illustrates replacement of a portion of an output value of the second NLU model with common information, according to an embodiment of the disclosure.

FIG. 10 illustrates replacement of a portion of the output value of the second NLU model 2332 with common information, according to an embodiment of the disclosure.

Referring to FIG. 10, when the second text of "What time is it now there?" including an anaphor is input to the second NLU model 2332, the second NLU model 2332 may output an intent and parameters representing a result of interpretation of the second text, in which common information corresponding to the anaphor is not reflected. For example, the second NLU model 2332 may output 'time information provision' as the intent and 'present (time)' and 'there (location)' as the parameters.

Thereafter, the second electronic device 2000 may extract common information corresponding to the anaphor 'there (location)' among the output values of the second NLU model 2332 from the common information DB 2343 and may replace the anaphor 'there (location)' with the extracted common information. For example, the second electronic device 2000 may replace the anaphor 'there (location)' with 'London (GeoPoint (Lat:51.50853, long:−0.12574))'. Although a value output by the second NLU model 2332 is replaced by a GPS value in FIG. 10, embodiments of the disclosure are not limited thereto. In order for the second electronic device 2000 to provide the user with a voice assistant service, a value of a preset format for use as a result of interpreting text may be replaced by the value output by the second NLU model 2332.

Figure 11:
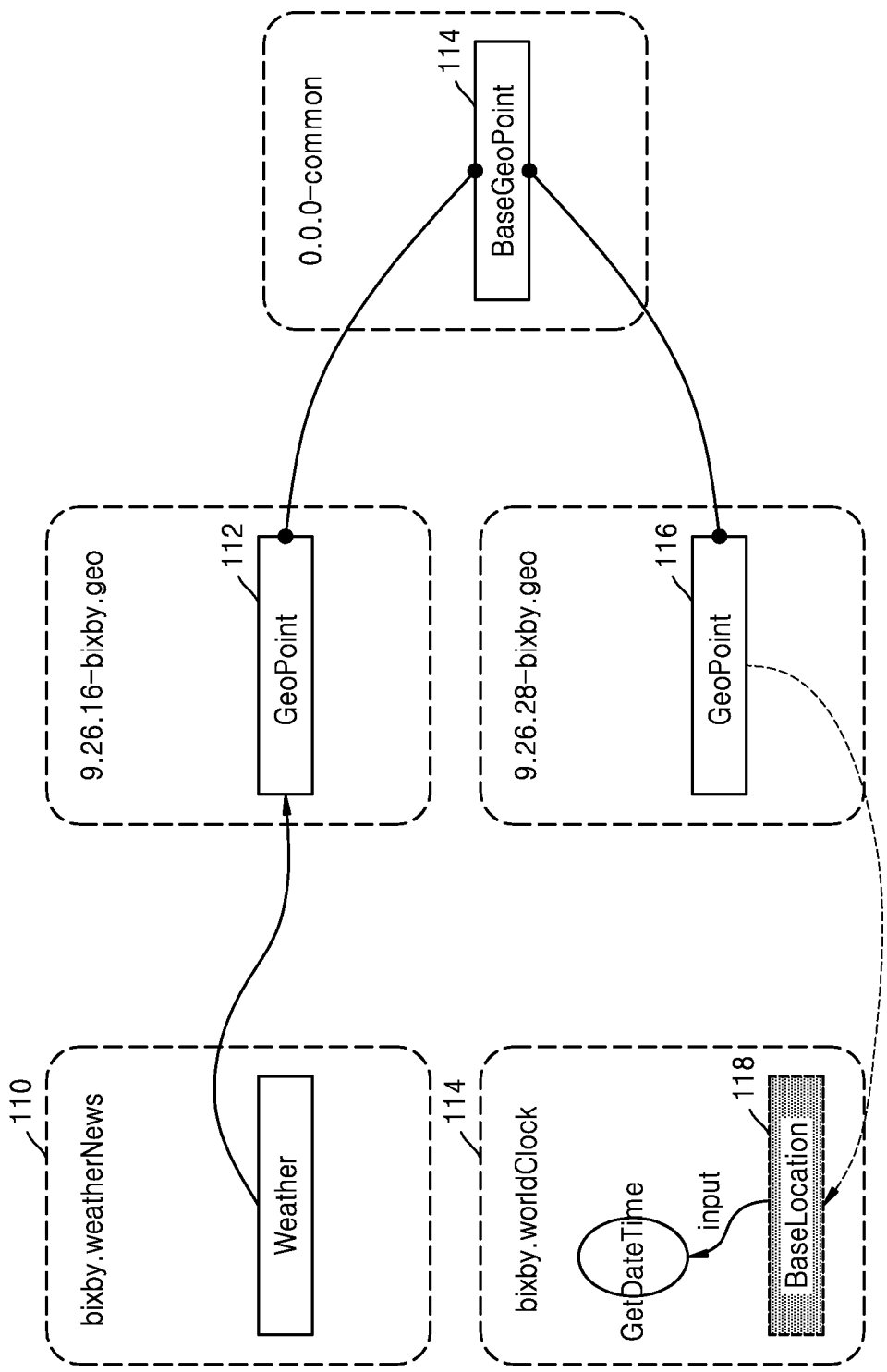
FIG. 11 is an illustration of generation and use of common information, according to an embodiment of the disclosure.

FIG. 11 is an illustration of generation and use of common information, according to an embodiment of the disclosure.

Referring to FIG. 11, in a voice assistant module 110 providing weather news, GeoPoint 112, which is a location value related to the weather having a preset format of 9.26.16 version, may be identified, and BaseGeoPoint 114, which is common information of a predetermined format representing GeoPoint 112 as the identified location value, may be generated and stored.

The voice assistant module 114 providing a world clock may identify GeoPoint 116, which is a location value having a preset format of 9.26.28 version, from BaseGeoPoint 114 as the common information, and may use GeoPoint 116 to provide time information corresponding to a location.

GeoPoint 116 as the location value may be transformed into a value usable by the voice assistant module 114 providing the world clock. For example, the voice assistant module 114 providing the world clock may generate BaseLocation 118, which is a location value on the map corresponding to GeoPoint 116 as the location value, and may use BaseLocation 118 as the generated location value to provide a present date and a present time at a corresponding location.

In this case, for example, GeoPoint 112 may be data that is operated by a voice assistant module for managing geographical information of 9.26.16 version, and GeoPoint 116 may be data that is operated by a voice assistant module for managing geographical information of 9.26.28 version. However, embodiments of the disclosure are not limited thereto.

Although it has been described above that GeoPoint 116 as the location value is transformed into a value usable by the voice assistant module 114 by the voice assistant module 114, embodiments of the disclosure are not limited thereto. GeoPoint 116 as the location value may be transformed by another voice assistant module. For example, BaseLocation 118 as the location value on the map corresponding to GeoPoint 116 as the location value may be generated by the voice assistant module for managing geographical information of 9.26.28 version, and the generated location value may be used by the voice assistant module 114 providing the world clock.

Figure 12A:
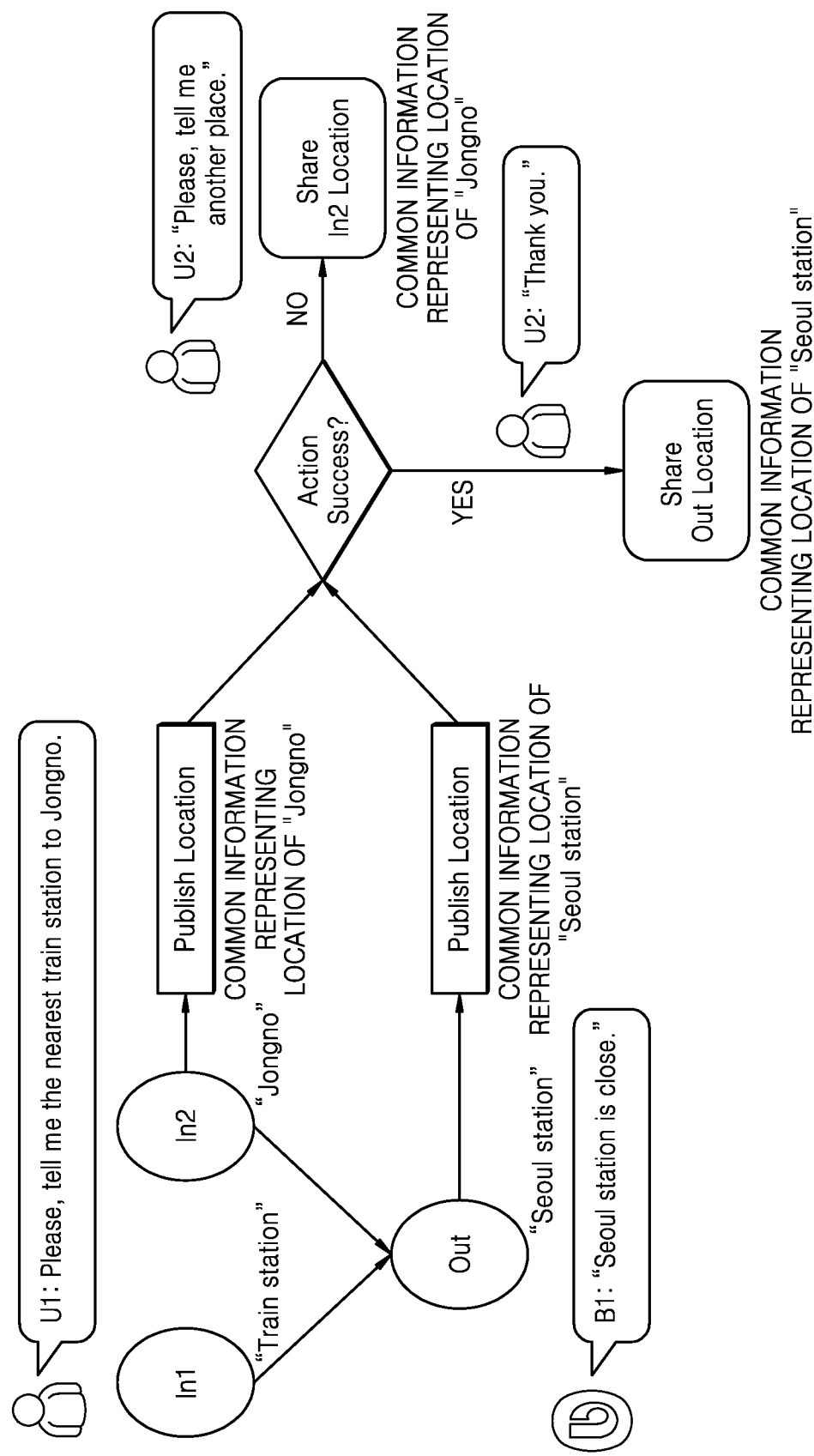
FIG. 12A illustrates selection and storage of some pieces of common information of the same type by considering a result of provision of a voice assistant service, according to an embodiment of the disclosure.

FIG. 12A illustrates selection and storage of some of pieces of common information of the same type by considering a result of provision of a voice assistant service, according to an embodiment of the disclosure.

Referring to FIG. 12A, common information representing the location of "Jongno" may be generated from text of the user of "Please, tell me the nearest train station to Jongno." A response message of "Seoul station is close." for the text of the user may be provided to the user.

When text of the user of "Thank you." is obtained, the second electronic device 2000 may identify that a right response message for the intention of the user has been provided to the user, and may store common information representing the location of "Seoul station" in the common information DB 2343.

When text of the user of "Please, tell me another place." is obtained, the second electronic device 2000 may identify that a wrong response message for the intention of the user has been provided to the user, and may store common information representing the location of "Jongno" in the common information DB 2343.

Figure 12B:
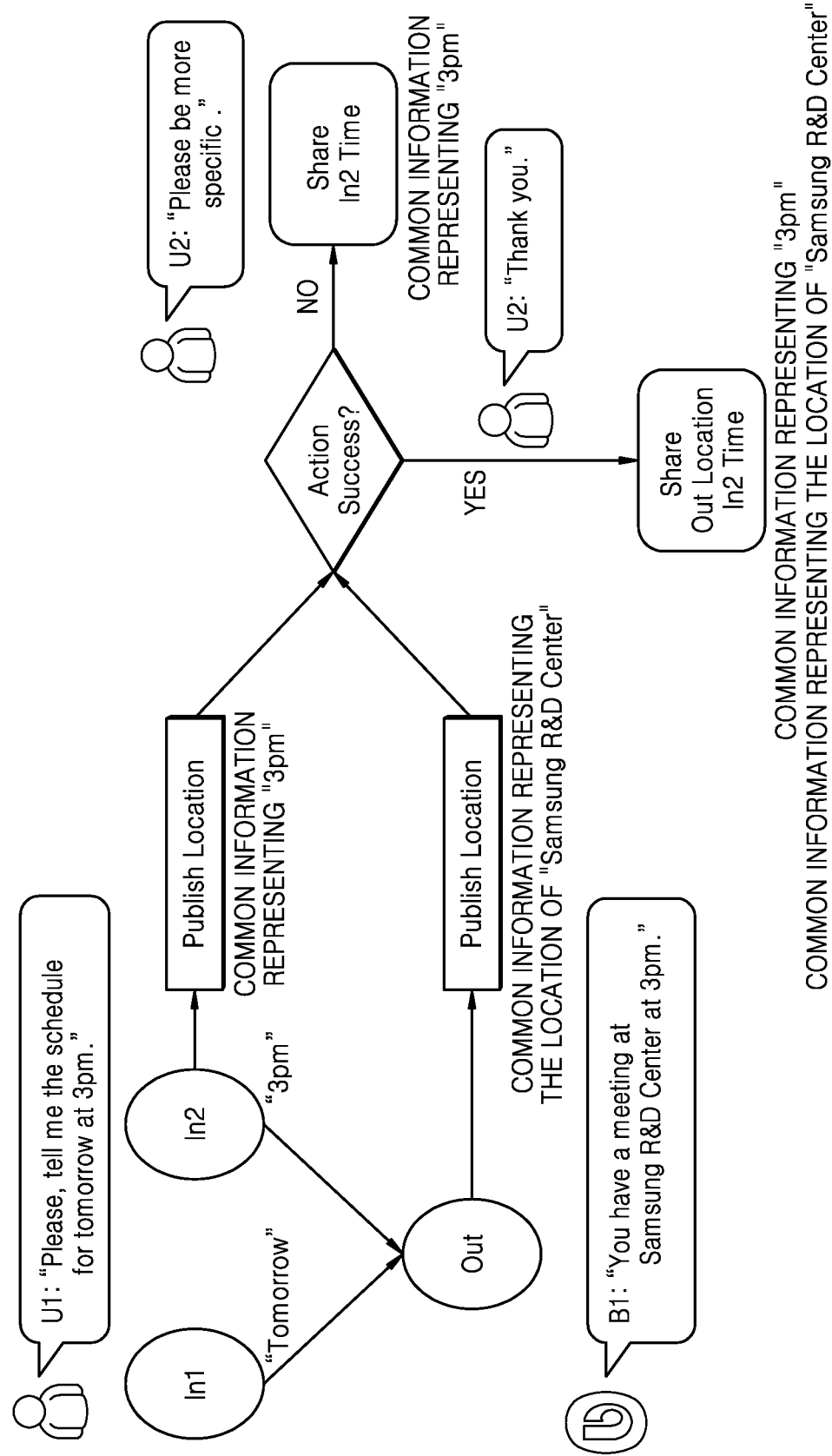
FIG. 12B illustrates selection and storage of some pieces of common information of different types by considering a result of provision of a voice assistant service, according to an embodiment of the disclosure.

FIG. 12B illustrates selection and storage of some of pieces of common information of different types by considering a result of provision of a voice assistant service, according to an embodiment of the disclosure.

Referring to FIG. 12B, common information representing "3 pm" may be generated from text of the user of "Please, tell me the schedule for tomorrow at 3 pm.". A response message of "You have a meeting at Samsung R&D Center at 3 pm." for the text of the usermay be provided to the user.

When text of the user of "Thank you." is obtained, the second electronic device 2000 may identify that a right response message for the intention of the user has been provided to the user, and may store common information representing "3 pm" and common information representing the location of "Samsung R&D Center" in the common information DB 2343.

When text of the user of "Please be more specific." is obtained, the second electronic device 2000 may identify that a wrong response message for the intention of the user has been provided to the user, and may store common information representing "3 pm" in the common information DB 2343.

Figure 12C:
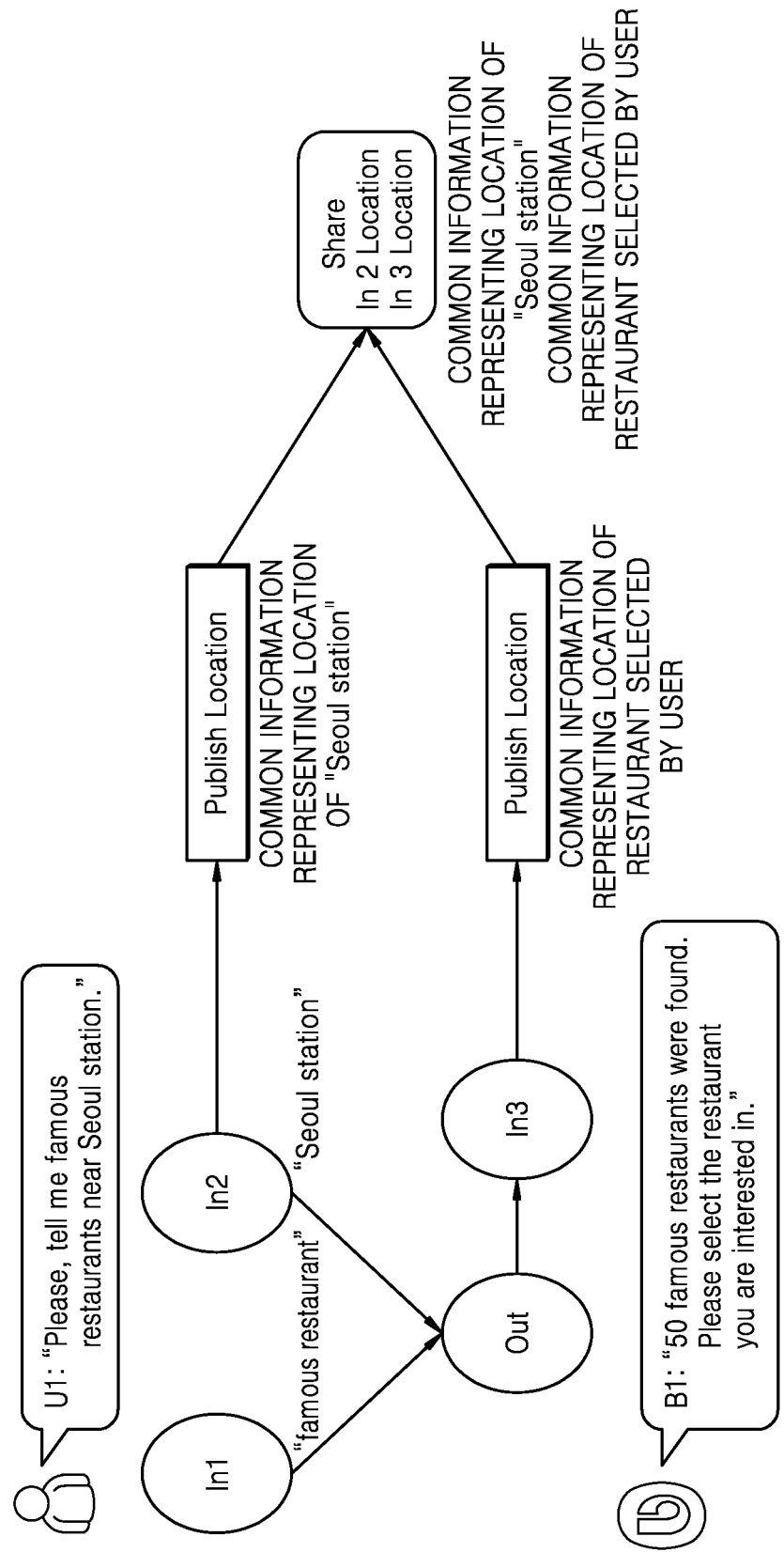
FIG. 12C illustrates selection and storage of some pieces of common information, based on a result of provision of a voice assistant service and an additional input of the user, according to an embodiment of the disclosure.

FIG. 12C illustrates selection and storage of some of pieces of common information, based on a result of provision of a voice assistant service and an additional input of the user, according to an embodiment of the disclosure.

Referring to FIG. 12C, common information representing the location of "Seoul station" may be generated from text of the user of "Please, tell me famous restaurants near Seoul station." A response message of "50 famous restaurants were found. Please select the restaurant you are interested in." for the text of the user may be provided to the user. Thereafter, when the user selects at least one restaurant from the 50 famous restaurants, the second electronic device 2000 may generate common information representing the location of the restaurant selected by the user. The second electronic device 2000 may store the common information representing the location of "Seoul station" and the common information representing the location of the restaurant selected by the user in the common information DB 2343.

In FIGS. 12A, 12B and 12C, pieces of common information are generated based on a result of provision of a voice assistant service and stored. However, an illustration of generation and storage of common information is not limited thereto. Various rules for generating, storing, and selecting common information may be set according to, for example, the type of a user inquiry, characteristics of a voice assistant service, and feedback of the user.

An embodiment of the disclosure may also be implemented in the form of a recording medium including instructions executable by a computer, such as a program module executed by a computer. Computer-readable media may be any available media accessible by a computer and includes both volatile and nonvolatile media and removable and non-removable media. Computer-readable media may also include computer storage media. Computer storage media includes both volatile and nonvolatile, removable and non-removable media implemented in any method or technology for storage of information such as computer readable instructions, data structures, program modules or other data.

In addition, computer-readable storage media may be provided in the form of non-transitory storage media. Here, a 'non-transitory storage medium' is a tangible device and may not contain a signal (e.g., electromagnetic waves). This term does not distinguish a case in which data is stored semi-permanently in a storage medium from a case in which data is temporarily stored. For example, the 'non-transitory storage medium' may include a buffer in which data is temporarily stored.

According to an embodiment of the disclosure, a method according to various disclosed embodiments may be provided by being included in a computer program product. Computer program products are commodities and thus may be traded between sellers and buyers. Computer program products are distributed in the form of device-readable storage media (e.g., compact disc read only memory (CD-ROM)), or may be distributed (e.g., downloaded or uploaded) through an application store (e.g., Play Store™) or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

A term "unit" used herein may be a hardware component such as a processor or circuit, and/or a software component executed by a hardware component such as a processor.

An expression "including at least one of a, b, or c" used herein may refer, for example, to "including only a", "including only b", "including only c", "including a and b", "including b and c", "including a and c", or "including both a, b and c".

Functions related to AI according to the disclosure are operated through a processor and a memory. The processor may include one or a plurality of processors. The one or plurality of processors may include, for example, and without limitation, a general-purpose processor such as a CPU, an AP, or a Digital Signal Processor (DSP), a graphics processor such as a GPU, a Vision Processing Unit (VPU), an AI-only processor such as an NPU, or the like. The one or plurality of processors control to process input data, according to a predefined operation rule or AI model stored in the memory. When the one or plurality of processors are AI-only processors, the AI-only processors may be designed in a hardware structure specialized for processing a specific AI model.

The predefined operation rule or AI model may refer to a model that it is created through learning. Here, being made through learning may refer, for example, to a basic AI model being learned using a plurality of learning data by a learning algorithm, so that a predefined operation rule or AI model set to perform desired characteristics (or a purpose) is created. Such learning may be performed in a device itself on which AI according to the disclosure is performed, or may be performed through a separate server and/or system. Examples of the learning algorithm include, but are not limited to, supervised learning, unsupervised learning, semi-supervised learning, or reinforcement learning.

The AI model may include a plurality of neural network layers. Each of the plurality of neural network layers may have a plurality of weight values, and performs a neural network operation through an operation between an operation result of a previous layer and the plurality of weight values. The plurality of weight values of the plurality of neural network layers may be optimized by the learning result of the AI model. For example, a plurality of weight values may be updated so that a loss value or a cost value obtained from the AI model is reduced or minimized during a learning process. The artificial neural network may include a deep neural network (DNN), including, for example, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep Q-Networks, or the like, but embodiments of the disclosure are not limited thereto.

In a method of providing a voice assistant service related to text including an anaphor, according to an embodiment of the disclosure, a device may receive a speech signal, which is an analog signal, through a microphone, and convert the speech signal into computer-readable text using an automatic speech recognition (ASR) model, in order to recognize a user's voice and interpret a user's intention. By interpreting the converted text using a Natural Language Understanding (NLU) model, a user's utterance intention may be obtained. The ASR model or the NLU model may be an AI model. The AI model may be processed by an AI-only processor designed with a hardware structure specialized for processing the AI model.

Linguistic understanding may refer, for example, to a technology that recognizes and applies/processes human language/character, and thus includes natural language processing, machine translation, a dialog system, question answering, and speech recognition/speech recognition/synthesis, etc.

In the method of providing a voice assistant service related to text including an anaphor, according to an embodiment of the disclosure, an AI model may be used to determine common information corresponding to a target word from the text. A processor may perform preprocessing on the text to transform the text into a format suitable for use as an input of the AI model.

Inference prediction may refer, for example, to a technology for logically reasoning and predicting information by judging information. Examples of the inference prediction include knowledge based reasoning, optimization prediction, preference-based planning, and recommendation.

While the disclosure has been illustrated and described with reference to various example embodiments, it will be understood that the various example embodiments are intended to be illustrative, not limiting. It will be further understood by those skilled in the art that various changes in form and details may be made therein without departing from the true spirit and full scope of the disclosure, including the appended claims and their equivalents. Thus, the above-described embodiments should be considered in descriptive sense only and not for purposes of limitation. For example, each component described as a single type may be implemented in a distributed manner, and similarly, components described as being distributed may be implemented in a combined form. It will also be understood that any of the embodiment(s) described herein may be used in conjunction with any other embodiment(s) described herein.

What is claimed is:

1. A method, performed by an electronic device, of providing a voice assistant service, the method comprising:
   obtaining first text generated from a first input;
   detecting a target word within the first text, wherein the target word includes a word that can be indicated by an anaphor;
   generating common information related to the detected target word using a first natural language understanding (NLU) model, wherein the common information includes detailed data representing the target word;
   obtaining second text generated from a second input;
   inputting the common information and the second text to a second NLU model;
   detecting an anaphor included in the second text;
   obtaining an intent and a parameter based on common information corresponding to the detected anaphor using the second NLU model; and
   generating response information related to the intent and the parameter.

2. The method of claim 1, further comprising:
   identifying a domain corresponding to the first text using the first NLU model; and
   matching the common information with the domain and storing a result of the matching,
   wherein the inputting of the common information and the second text to the second NLU model comprises inputting the common information stored by being matched with the domain and the second text to the second NLU model.

3. The method of claim 2, further comprising:
   identifying a domain of the second text using the first NLU model,
   wherein the inputting of the common information and the second text to the second NLU model comprises inputting the common information associated with the domain of the second text and the second text to the second NLU model.

4. The method of claim 3, further comprising:
transforming the common information associated with the second text into a format usable by a voice assistant module corresponding to the identified domain of the second text,
wherein the second text is interpreted using the common information having the usable format.

5. The method of claim 2, wherein the first NLU model includes an artificial intelligence (AI) model trained using text tagged with a type of common information and a domain of the tagged text as learning data.

6. The method of claim 1, further comprising:
identifying a domain of the second text using the first NLU model; and
selecting, as the second NLU model, a model corresponding to the identified domain of the second text from among a plurality of NLU models.

7. The method of claim 6, wherein the target word includes a word representing at least one of a location, a date, time, or a person,
and
the detailed data has a format commonly identifiable by a plurality of voice assistant modules corresponding to the plurality of NLU models.

8. The method of claim 1, wherein pieces of common information about target words included in texts obtained prior to the second text being obtained are accumulated and stored.

9. The method of claim 1, further comprising:
detecting the target word within the first text using the second NLU model; and
correcting the common information corresponding to the target word.

10. The method of claim 1, further comprising:
detecting a target word within the first text using the first NLU model; and
replacing common information corresponding to a target word within the first text with common information corresponding to the target word within the second text.

11. A server configured to provide a voice assistant service, the server comprising:
a communication interface comprising communication circuitry configured to communicate with an electronic device;
at least one processor; and
memory storing one or more instructions which, when executed by the at least one processor, cause the at least one processor to control the server to:
obtain first text generated from a first input to the electronic device,
detect a target word within the first text, wherein the target word includes a word that can be indicated by an anaphor,
generate common information related to the detected target word using a first natural language understanding (NLU) model, wherein the common information includes detailed data representing the target word,
obtain second text generated from a second input,
input the common information and the second text to a second NLU model,
detect an anaphor included in the second text,
obtain an intent and a parameter based on common information corresponding to the detected anaphor using the second NLU model, and
generate response information related to the intent and the parameter.

12. The server of claim 11, wherein the memory stores instructions which, when executed by the at least one processor, cause the at least one processor to control the server to:
identify a domain corresponding to the first text using the first NLU model, and match the common information with the domain and store a result of the matching, and
input the common information stored by being matched with the domain and the second text to the second NLU model.

13. The server of claim 12, wherein the memory stores instructions which, when executed by the at least one processor, cause the at least one processor to control the server to:
identify a domain of the second text using the first NLU model and input the common information associated with a domain of the second text and the second text to the second NLU model.

14. The server of claim 12, wherein the first NLU model includes an artificial intelligence (AI) model trained using text tagged with a type of common information and a domain of the text as learning data.

15. A non-transitory computer-readable recording medium having recorded thereon a computer program which, when executed by a computer, causes the computer to:
obtain first text generated from a first input,
detect a target word within the first text, wherein the target word includes a word that can be indicated by an anaphor,
generate common information related to the detected target word using a first natural language understanding (NLU) model, wherein the common information includes detailed data representing the target word,
obtain second text generated from a second input,
input the common information and the second text to a second NLU model,
detect an anaphor included in the second text,
obtain an intent and a parameter based on common information corresponding to the detected anaphor using the second NLU model, and
generate response information related to the intent and the parameter.

* * * * *